United States Patent
Choi et al.

(10) Patent No.: US 12,481,323 B2
(45) Date of Patent: Nov. 25, 2025

(54) DISPLAY DEVICE

(71) Applicant: LG ELECTRONICS INC., Seoul (KR)

(72) Inventors: Woojin Choi, Seoul (KR); Sunho Hwang, Seoul (KR); Yongwoo Yoo, Seoul (KR); Jihoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 17/758,394

(22) PCT Filed: Jan. 2, 2020

(86) PCT No.: PCT/KR2020/000039
§ 371 (c)(1),
(2) Date: Jul. 5, 2022

(87) PCT Pub. No.: WO2021/137333
PCT Pub. Date: Jul. 8, 2021

(65) Prior Publication Data
US 2023/0026197 A1    Jan. 26, 2023

(51) Int. Cl.
*G06F 1/16*     (2006.01)
*A63F 13/25*    (2014.01)
*G09G 3/00*     (2006.01)

(52) U.S. Cl.
CPC ............ *G06F 1/1652* (2013.01); *A63F 13/25* (2014.09); *G09G 3/035* (2020.08); *G09G 2320/0261* (2013.01); *G09G 2340/045* (2013.01); *G09G 2354/00* (2013.01)

(58) Field of Classification Search
CPC ....... G06F 1/1652; A63F 13/25; G09G 3/035; G09G 2320/0261; G09G 2340/045; G09G 2354/00
See application file for complete search history.

(56) References Cited

U.S. PATENT DOCUMENTS

| 2009/0025022 A1* | 1/2009 | Blatchley | H04H 60/65 725/9 |
| 2015/0009636 A1* | 1/2015 | Jeong | B65H 18/10 361/749 |

(Continued)

FOREIGN PATENT DOCUMENTS

| JP | 2002372930 | 12/2002 |
| KR | 1020150004547 | 1/2015 |

(Continued)

OTHER PUBLICATIONS

PCT International Application No. PCT/KR2020/000039, International Search Report dated Oct. 13, 2020, 3 pages.

*Primary Examiner* — Kang Hu
*Assistant Examiner* — Ross A Williams
(74) *Attorney, Agent, or Firm* — LEE, HONG, DEGERMAN, KANG & WAIMEY

(57) ABSTRACT

A display device according to an embodiment of the present disclosure may comprise: a roller accommodated in the housing; a display configured to be withdrawn from or retracted into the housing by operating the roller; and a control unit configured to control the roller such that a screen of the display is formed to face at least one of a first direction and a second direction.

12 Claims, 26 Drawing Sheets

(56) References Cited

U.S. PATENT DOCUMENTS

| | | | | |
|---|---|---|---|---|
| 2016/0034036 | A1* | 2/2016 | Ahmed | G06F 3/1446 |
| | | | | 345/156 |
| 2017/0212607 | A1* | 7/2017 | Yoon | G06F 3/147 |
| 2019/0146557 | A1* | 5/2019 | Choi | G06F 3/04847 |
| | | | | 361/749 |
| 2019/0155492 | A1* | 5/2019 | Woo | G06F 3/04847 |
| 2020/0058272 | A1* | 2/2020 | Oh | G09G 5/14 |
| 2020/0226971 | A1* | 7/2020 | Yi | G09G 5/14 |
| 2020/0320907 | A1* | 10/2020 | Yamamoto | H10K 59/00 |
| 2021/0201722 | A1* | 7/2021 | Jeong | G09F 9/37 |

FOREIGN PATENT DOCUMENTS

| | | |
|---|---|---|
| KR | 1020170012628 | 2/2017 |
| KR | 1020170043347 | 4/2017 |
| KR | 1020170089664 | 8/2017 |

\* cited by examiner (a)

(d)

(c)

(a)

(b)

(a)

(b)

(a)

(b)

(a)

(b)

(a)

(b)

(a)

(b)

(a)

(b)

(a)

(b)

(a) SCREEN IN FIRST DIRECTION (b) SCREEN IN SECOND DIRECTION (a) SCREEN IN FIRST DIRECTION (b) SCREEN IN SECOND DIRECTION (a) SCREEN IN FIRST DIRECTION (b) SCREEN IN SECOND DIRECTION (a) SCREEN IN FIRST DIRECTION (b) SCREEN IN SECOND DIRECTION (a) SCREEN IN FIRST DIRECTION (b) SCREEN IN SECOND DIRECTION

DISPLAY DEVICE

CROSS-REFERENCE TO RELATED APPLICATION(S)

This application is the National Stage filing under 35 U.S.C. 371 of International Application No. PCT/KR2020/000039, filed on Jan. 2, 2020, the contents of which are all incorporated by reference herein in its entirety.

TECHNICAL FIELD

The present disclosure relates to a display device, and more particularly, to a display device having a bendable display.

BACKGROUND ART

A display device has a function of receiving, processing, and displaying an image to be viewed by a user. For example, the display device receives a broadcast signal selected by a user among broadcast signals transmitted from a broadcasting station, separates an image signal from the received signal, and re-displays the separated image signal on a display.

Recently, by virtue of development of broadcasting technology and network technology, a function of a display device has been significantly diversified and accordingly the performance of the device has also been enhanced. That is, the display device has developed to provide various different contents as well as simply broadcast content to a user. For example, the display device can provide gameplay, listening to music, Internet shopping, user customized information, or the like using various applications as well as programs received from a broadcasting station. In order to perform such extended functions, the display device is basically connected to other devices or networks using various communication programs and provides a ubiquitous computing environment to a user. That is, the display device has evolved to a smart device for achieving connectivity to a network and ubiquitous computing.

On the other hand, in recent years, a flexible display that has enough elasticity to be greatly deformed has been developed. Such a flexible display is deformable enough to be rolled into a main body of the display device.

The display device may include a flexible display as described above in which an area protruding to the outside of the display is changed by being rolled or unrolled in a direction guided by a roller. By using such a rollable display, the display device may have a more compact structure.

On the other hand, a conventional display device having a rollable display outputs content in only a single direction.

DISCLOSURE

Technical Problem

An object of the present disclosure is to provide a display device capable of outputting content in two or more directions.
An object of the present disclosure is to provide a display device capable of controlling a screen output direction.
An object of the present disclosure is to provide a display device capable of outputting content according to a direction or height in which a user can easily view the content.
An object of the present disclosure is to provide a display device capable of variously outputting a screen according to the characteristics of content.

Technical Solution

The display apparatus according to the embodiment of the present disclosure may comprise a housing, a display configured to be withdrawn from or retracted into the housing by operating the roller; and a control unit configured to control the roller such that a screen of the display is formed to face at least one of a first direction and a second direction.

The control unit is configured to configure a screen in one of the first direction and the second direction such that content is output in a forward direction, and configure a screen in the other of the first direction and the second direction such that content is output in a reverse direction.

The display device may further comprising a sensor unit configured to detect a user, wherein the control unit is configured to determine a screen output direction of the display based on a result of detection by the sensor unit.

The control unit is configured to control the roller such that a direction in which the user is positioned matches the screen output direction.

The control unit is configured to determine a direction in which the user's face is detected as the screen output direction.

The control unit is configured to further detect a distance from the user through the sensor unit, and control a withdrawal length of the display according to the distance from the user.

The control unit is configured to control the roller such that the display is withdrawn out to a preset length or more when the distance from the user is less than a preset distance.

The control unit is configured to control a number of pieces of content output on the screen according to an image ratio of first content when the display is withdrawn out to the preset length or more.

The control unit is configured to control the display to further display second content in addition to the first content on the screen when the first content is content having a fixed image ratio, and display the first content alone on the screen when the first content is not content having a fixed image ratio.

The control unit is configured to further detect a distance from the user through the sensor unit, and control a size of a user interface (UI) output on the screen according to the distance from the user.

The control unit is configured to control the display such that the size of the UI in a case in which the distance from the user is less than a preset distance is smaller than the size of the UI in a case in which the distance from the user is greater than or equal to the preset distance.

The control unit is configured to further detect a distance from the user through the sensor unit, and control the roller such that a withdrawal length of the display increases in proportion to the distance from the user.

The control unit is configured to control a withdrawal length of the display according to content output on the screen.

The control unit is configured to control an withdrawal direction of the display according to content output on the screen.

The control unit is configured to control the roller such that the screen is formed to face each of the first direction and the second direction when the content output on the screen is a game.

Advantageous Effects

According to an embodiment of the present disclosure, since content can be output in two or more directions, there are advantages in that a user can view content in various directions, and a display effect through the display device is maximized.

According to an embodiment of the present disclosure, since the screen output direction can be controlled, there are advantages in that it is possible to create an environment in which content viewing is easy according to a user state or characteristics of the content.

According to an embodiment of the present disclosure, there is an advantage of increasing usability of the rollable display by providing two or more withdrawal directions of the rollable display.

MODE FOR INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves. In addition, in describing the embodiments disclosed herein, when it is determined that the detailed description of the related known technology may obscure the gist of the embodiments disclosed herein, the detailed description thereof will be omitted. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are generally only used to distinguish one element from another.

When an element is referred to as being "connected with" another element, the element can be connected with the other element or intervening elements can also be present. In contrast, when an element is referred to as being "directly connected with" another element, there are no intervening elements present.

A singular representation can include a plural representation unless it represents a definitely different meaning from the context.

It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

The display device described in this specification refers to a TV, a smart TV, a network TV, a hybrid broadcast broadband television (HBBTV), an Internet TV, a web TV, an Internet protocol television (IPTV), digital signage, a desktop computer, a smartphone, a laptop computer, a digital broadcast terminal, a personal digital assistant (PDA), a portable multimedia player (PMP), a navigation system, a slate PC, a tablet PC, an ultrabook, a wearable device, etc. Including a rollable display. Here, rollable display means that a display can be rolled in the form of a roll and can include a flexible display, a foldable display, etc.

Therefore, the embodiments described in this disclosure can also be applied to smartphones or the like and mobile terminals having a rollable display or the like, as well as to smart TVs or the like.

Figure 1:
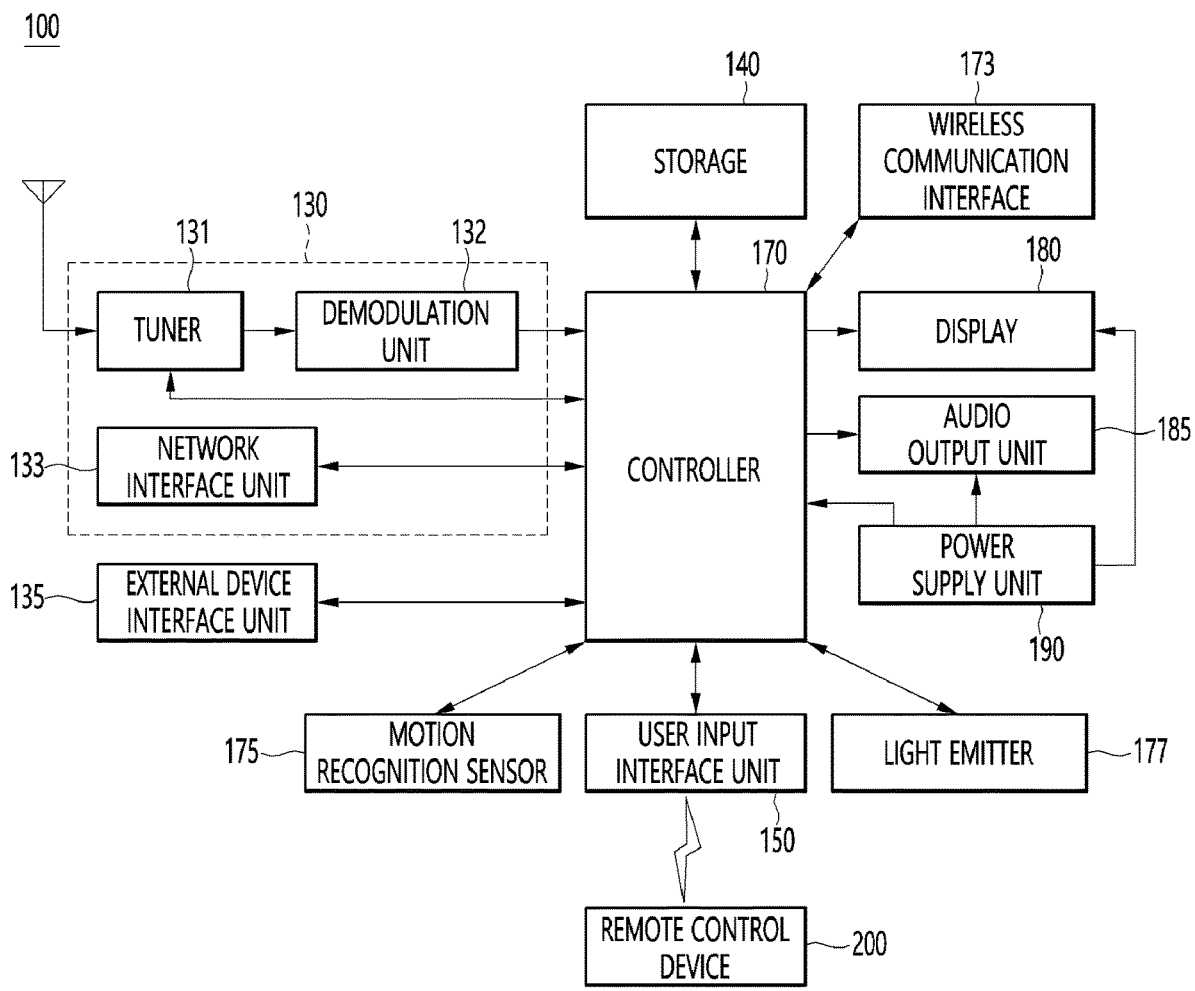
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 includes a broadcast reception unit 130, an external device interface unit 135, a storage 140, a user input interface unit 150, a controller 170, a wireless communication unit 173, a voice acquisition unit 175, a display 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 may receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 provides an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it may transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can also select and receive a desired application among applications open to the air, through network.

The external device interface unit 135 can receive an application or an application list in an adjacent external device and deliver it to the controller 170 or the storage 140.

The external device interface unit 135 can receive an application or an application list in an adjacent external device and deliver it to the controller 170 or the storage 140.

The external device interface 135 can receive at least one of image and audio output from an external device that is wirelessly or wiredly connected to the display device 100 and deliver it to the controller. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display 180. A sound signal of an external device input through the external device interface unit 135 can be output through the audio output unit 185.

An external device connectable to the external device interface unit 130 may be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals output from the external device interface unit 135 or the network interface unit 133 and can store information on a predetermined image through a channel memory function.

The storage 140 can also store an application or an application list input from the external device interface unit 135 or the network interface unit 133.

The display device 100 can play content files (for example, video files, still image files, music files, document files, application files, and so on) stored in the storage 140 and provide them to a user.

The user input interface unit 150 can deliver signals input from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals input from local keys (not shown) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface unit 135.

Voice signals processed in the controller 170 can be output to the audio output unit 185. Additionally, voice signals processed in the controller 170 can be input to an external output device through the external device interface unit 135.

Besides that, the control module 170 can control overall operations in the display device 100.

Additionally, the controller 170 can control the display device 100 by a user command or internal program input through the user input interface unit 150 and download a desired application or application list into the display device 100 in access to network.

The controller 170 can output channel information selected by a user together with processed image or voice signals through the display 180 or the audio output unit 185.

Additionally, according to an external device image playback command received through the user input interface unit 150, the controller 170 can output image signals or voice signals of an external device such as a camera or a camcorder, which are input through the external device interface unit 135, through the display 180 or the audio output unit 185.

Further, the controller 170 can control the display 180 to display images and control broadcast images input through the tuner 131, external input images input through the external device interface unit 135, images input through the network interface unit, or images stored in the storage 140 to be displayed on the display 180. In this instance, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

Further, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The voice acquisition unit 175 can acquire audio. The voice acquisition unit 175 can include at least one microphone (not shown), and can acquire audio around the display device 100 through the microphone (not shown).

The display 180 can convert image signals, data signals, or OSD signals, which are processed in the controller 170, or images signals or data signals, which are received in the external device interface unit 135, into R, G, and B signals to generate driving signals.

The audio output unit 185 receives the audio processed signal from the controller 170 and outputs the sound.

The power supply unit 190 supplies the corresponding power throughout the display device 100. In particular, the power supply unit 190 supplies power to the controller 170 that can be implemented in the form of a System On Chip (SOC), a display 180 for displaying an image, and the audio output unit 185 for outputting audio or the like.

Specifically, the power supply unit 190 can include a converter for converting an AC power source into a DC power source, and a dc/dc converter for converting a level of the DC source power.

Furthermore, the display device 100 shown in FIG. 1 is just one embodiment of the present disclosure and thus, some of the components shown can be integrated, added, or omitted according to the specification of the actually implemented display device 100.

That is, if needed, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

For example, the display device 100 can be divided into an image processing device such as a set-top box for receiving broadcast signals or contents according to various network services and a content playback device for playing contents input from the image processing device.

Figure 2:
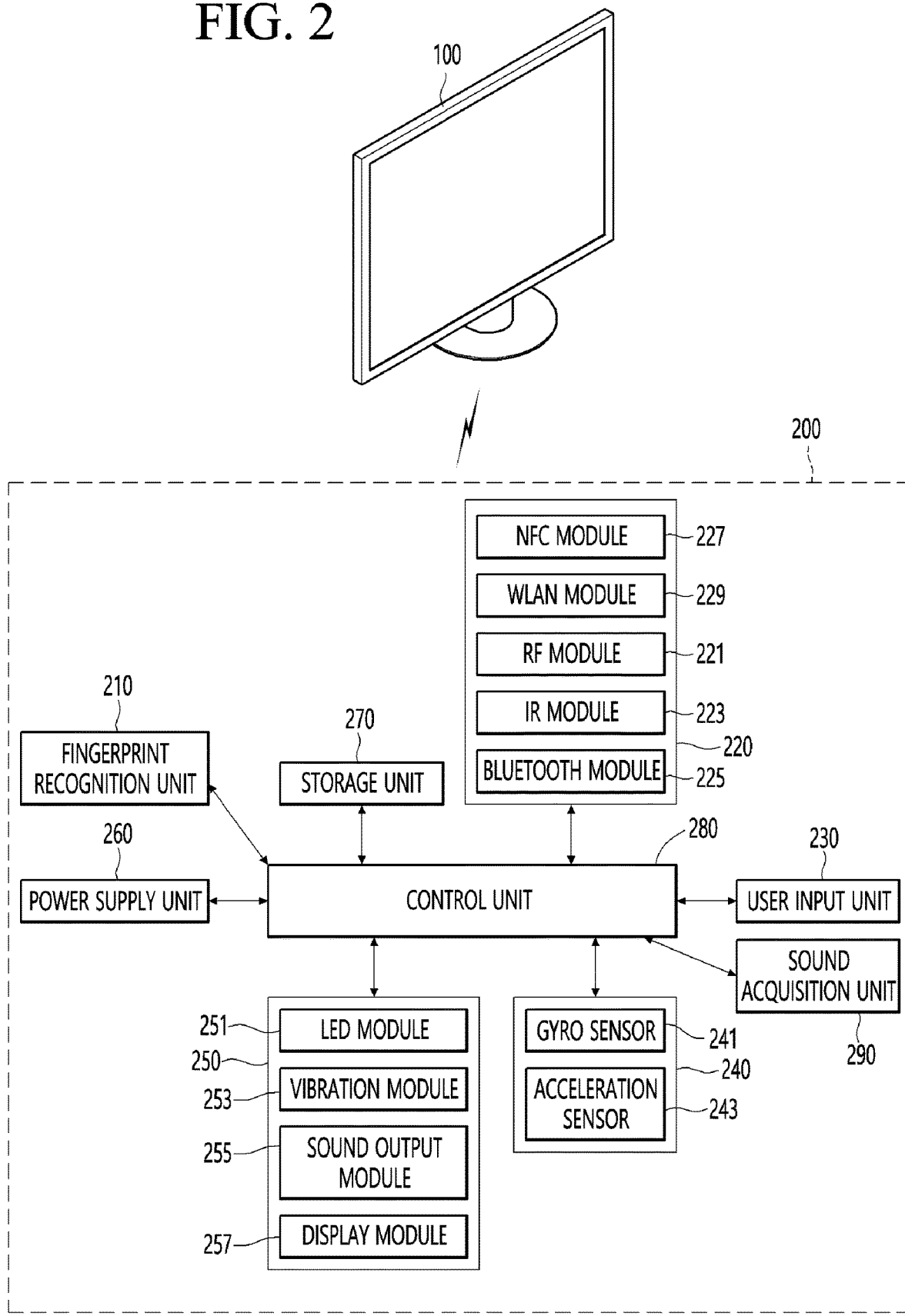
FIG. 2 is a block diagram illustrating a remote control device according to an embodiment of the present disclosure.
Figure 3:
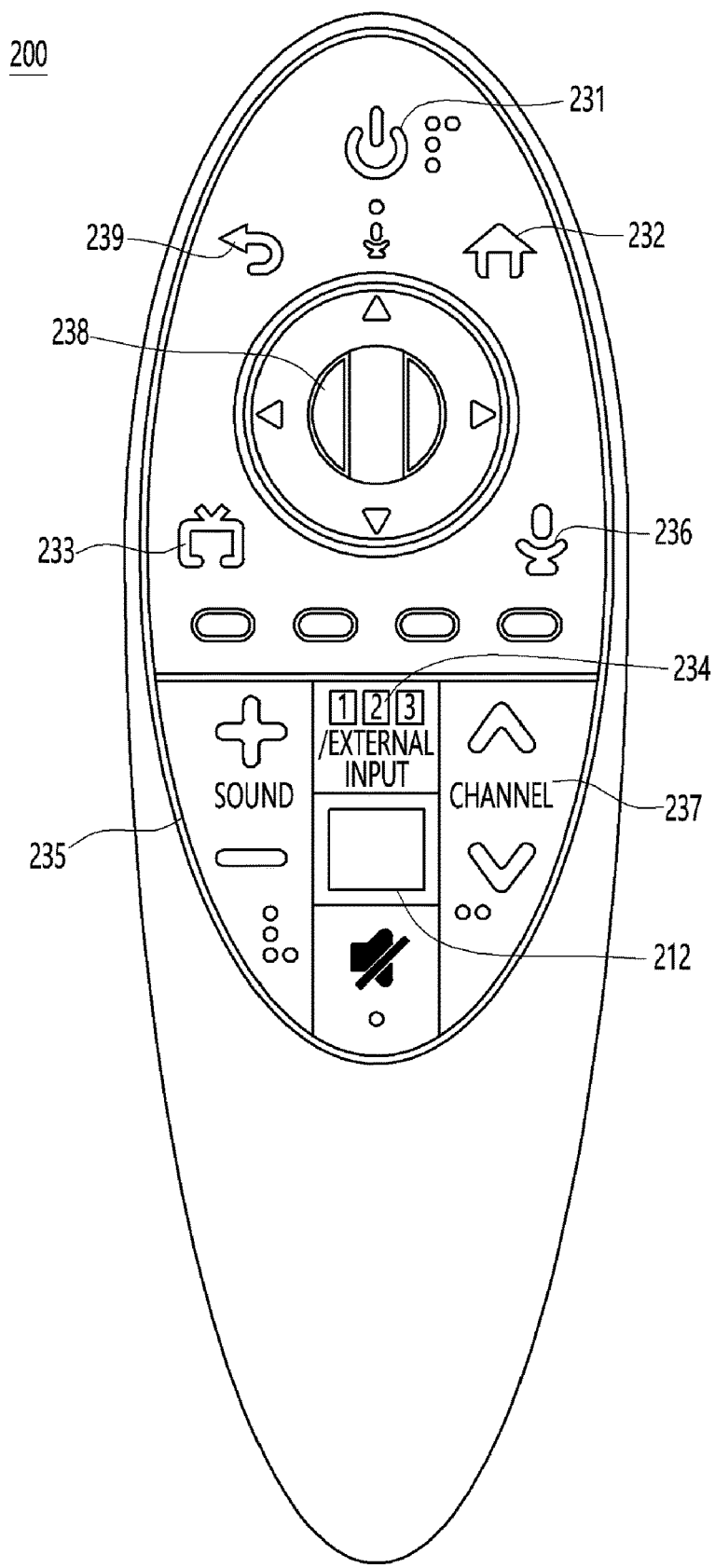
FIG. 3 is a view illustrating an actual configuration of a remote control device according to an embodiment of the present disclosure.

Next, referring to FIGS. 2 and 3, a remote control device is described according to an embodiment of the present disclosure.

FIG. 2 is a block diagram illustrating a remote control device according to an embodiment of the present disclosure, and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Further, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. Thus, a user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The power button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving a user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input mechanisms manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 based on x, y, and z axes and the acceleration sensor 243 can sense information on a movement speed of the remote control device 200. Further, the remote control device 200 can further include a distance measurement sensor and sense a distance with respect to the display 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input unit 235 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Figure 4:
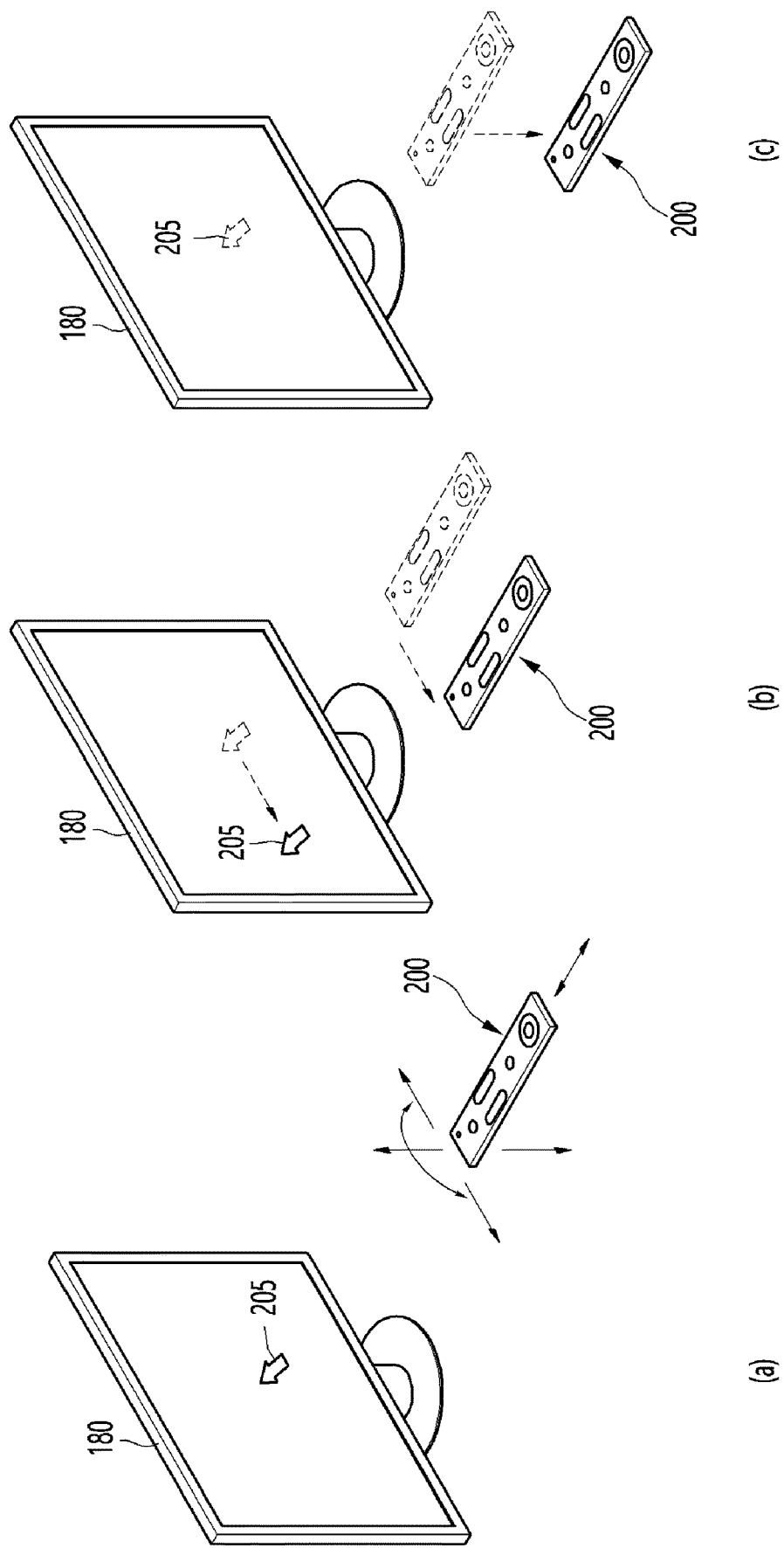
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4(a) illustrates that a pointer 205 corresponding to the remote control device 200 is displayed on the display 180.

In addition, a user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display 180. Thus, a selection area in the display 180 corresponding to the pointer 205 can be zoomed in and displayed largely.

If a user moves the remote control device 200 close to the display 180, a selection area in the display 180 corresponding to the pointer 205 can be zoomed out and displayed reduced.

If the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Further, the moving speed or moving direction of the pointer 205 can correspond to the moving speed or moving direction of the remote control device 200.

In addition, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
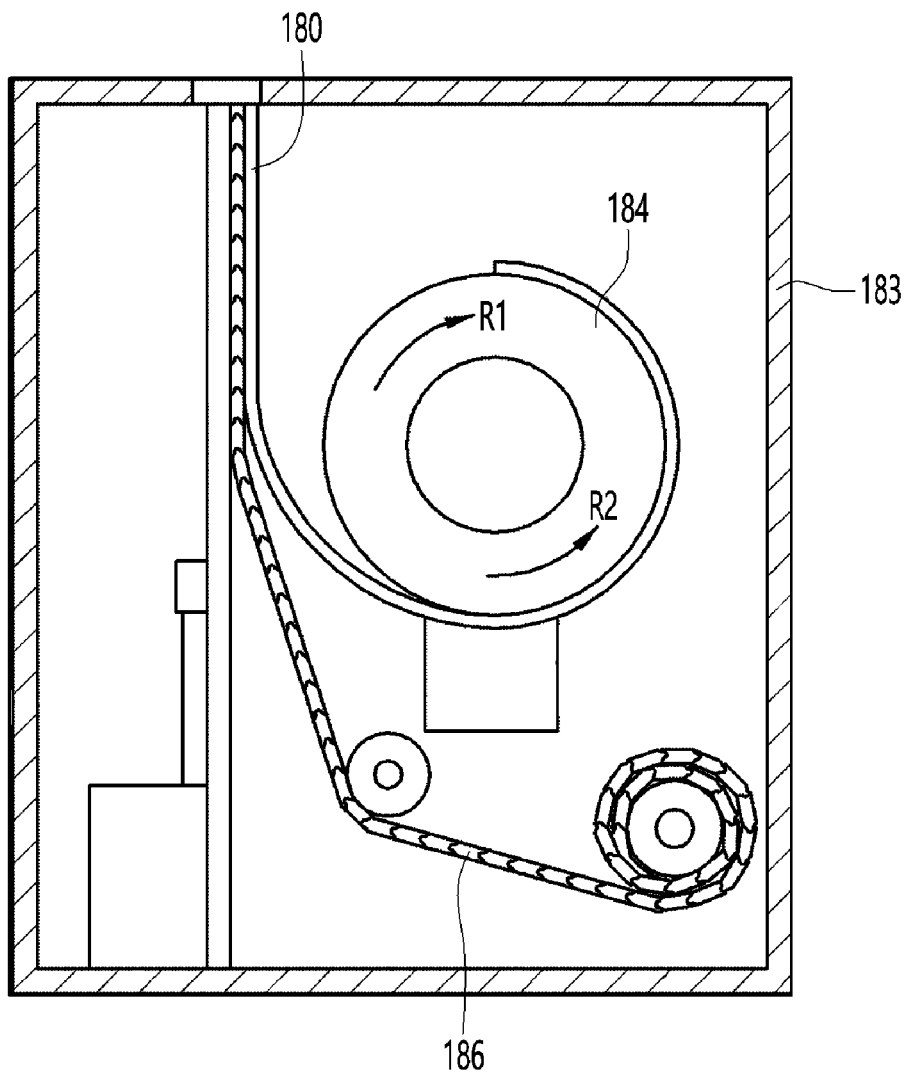
FIG. 5 is a cross-sectional view illustrating an internal part of a housing of a display device according to the present disclosure.

Next, FIG. 5 is a cross-sectional view illustrating an internal part of a housing of a display device 100 according to the present disclosure.

As shown, the display device 100 can include a housing 183, a display 180 drawn into or out from the housing 183, and a roller 184 that guides the display 180 to be wound or unwound. As such, the display 180 drawn into or out from the housing 183 can be a rollable display, and the rollable display can be a display which can be significantly deformable with sufficient elasticity.

The roller 184 can be received in the housing 183.

The roller 184 may be rotatable such that the display 180 is wound or unwound. The roller 184 can be a guide bar that guides the display 180 to be wound or unwound.

Referring to FIG. 5, when the roller 184 rotates in the R1 direction, the display 180 can be drawn out from the housing 183. In contrast, when the roller 184 rotates in the R2 direction, the display 180 can be drawn into the housing 183, while being wound around the roller 184. As such, the display 180 can be drawn out or drawn in an up-down direction.

As shown in FIG. 5, the display 180 can be drawn out or drawn in the up-down direction. According to an embodiment, the display device 100 can be configured such that the display 180 is drawn out or drawn in a left-right direction.

The display 180 can be drawn out from the housing 183 or can be drawn into the housing 183 according to rotation of the roller 184.

The controller 170 can control the display 180 to display content in an area of the display 180 drawn out from the housing 183.

According to an embodiment, the display device 100 can further include a cover 186. The cover 186 may be disposed in the housing 183 and protecting the display 180 drawn in the housing 183.

As such, as the display 180 is drawn out from or drawn into the housing 183, the area where content is displayed can increase or decrease. That is, the display area of the content of the display 180 varies as the display 180 is drawn out or drawn in.

Meanwhile, according to the structure shown in FIG. 5, the screen may be formed to face only a single direction.

Figure 6:
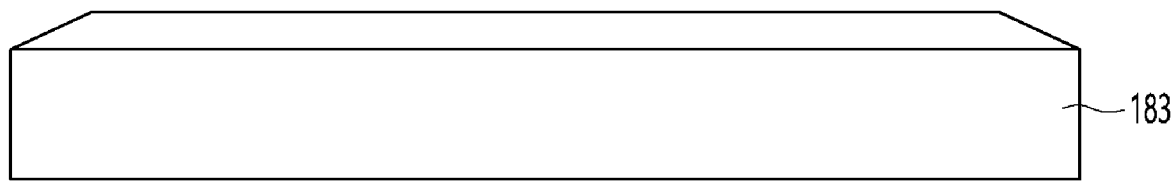
FIGS. 6 to 8 are diagrams showing examples of display modes when the housing is formed in a structure as shown in FIG. 5.
Figure 7:
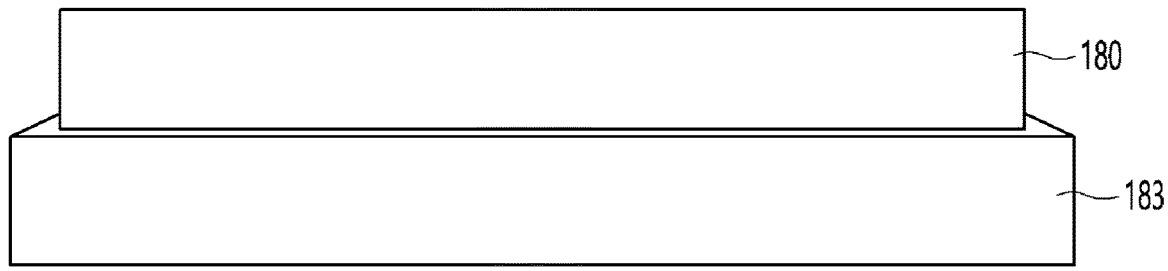
Figure 8:

FIGS. 6 to 8 are diagrams showing examples of display modes when the housing is formed in a structure as shown in FIG. 5.

FIG. 6 is a view illustrating an appearance of the display device when a mode of the display is the zero view mode according to an embodiment of the present disclosure, FIG. 7 is a view illustrating an appearance of the display device when a mode of the display is the partial view mode according to an embodiment of the present disclosure, and FIG. 8 is a view illustrating an appearance of the display device when a mode of the display is the full view mode according to embodiments of the present disclosure.

Meanwhile, terms used in the present disclosure, for example, "zero view mode", "partial view mode" and "full view mode" are merely examples for convenience of description, and thus these terms can be modified. Therefore, the present disclosure is not limited thereto.

The zero view mode is a mode in which the display 180 operates in a state in which the display 180 is entirely drawn in the housing 183. As shown in FIG. 6, in the zero view mode, the display 180 is entirely located inside the housing 183.

For example, when operating in a speaker mode, the display device 100 can control the mode of the display to be in the zero view mode. In addition, when the display device 100 is powered off, the display 180 can be controlled to be in the zero view mode.

When the display 180 is in the zero view mode, the display 180 does not display content in the entire area of the display 180. The display 180 can also be turned off in the zero view mode.

The partial view mode is a mode in which the display 180 operates in a state of being partially drawn out from the housing 183. As shown in FIG. 7, in the partial view mode, a part of the display 180 can be located inside the housing 183 and a remaining part of the display 180 can be located outside the housing 183.

For example, when the display device 100 operates in a menu mode, a mood mode, a music mode, a frame mode, or a clock mode, the mode of the display can be controlled in the partial view mode.

When the display 180 is in the partial view mode, the display 180 can display content only in an area of the display 180 drawn out from the housing 183. That is, in the partial view mode, the content is not displayed in an area of the display 180 drawn in the housing 183.

The full view mode is a mode in which the display 180 operates in a state of being maximally drawn out from the housing 183. That is, the full view mode is a mode in which a length of the display 180 drawn out from the housing 183 is a maximum. As shown in FIG. 8, in the full view mode, the display 180 can be entirely drawn out from the housing 183.

For example, when the display device 100 operates in a normal mode, the display can be controlled in the full view mode, and here, the normal mode can be a mode in which a broadcast image, an input image from the external device interface unit 135, and the like is output.

When the display 180 is in the full view mode, content can be displayed in an area of the display 180 drawn from the housing 183. In the full view mode, the display 180 can display content in the entire area of the display 180 available for outputting an image.

As described above with reference to FIGS. 6 to 8, the display area of the content can vary depending on the display mode, that is, the drawn-out length of the display 180.

Figure 9:
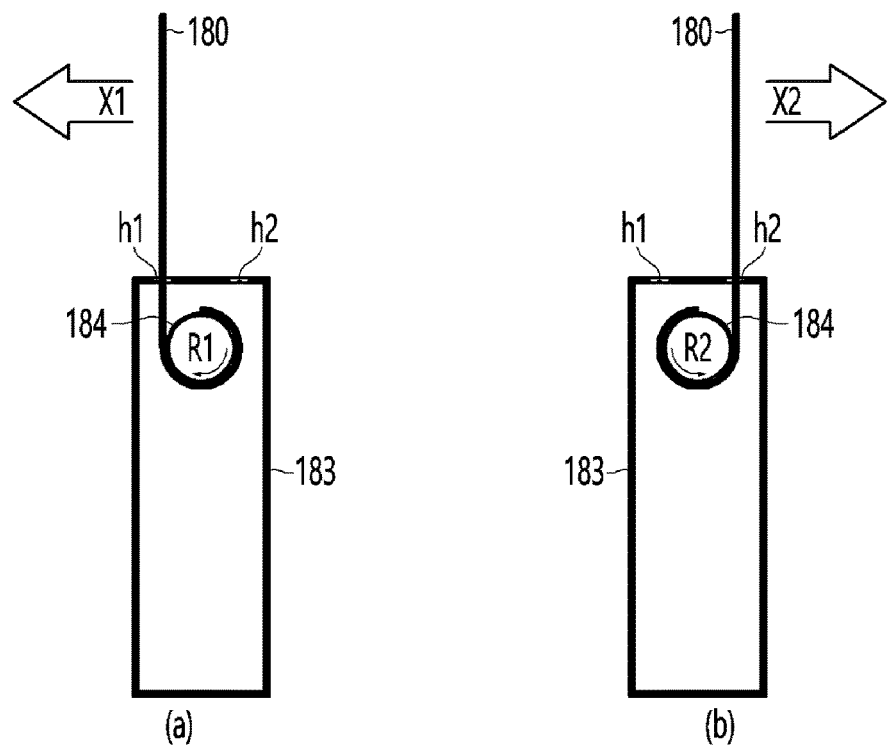
FIG. 9 is a cross-sectional view showing an inside of a housing of a display device according to a second embodiment of the present disclosure.
Figure 9:
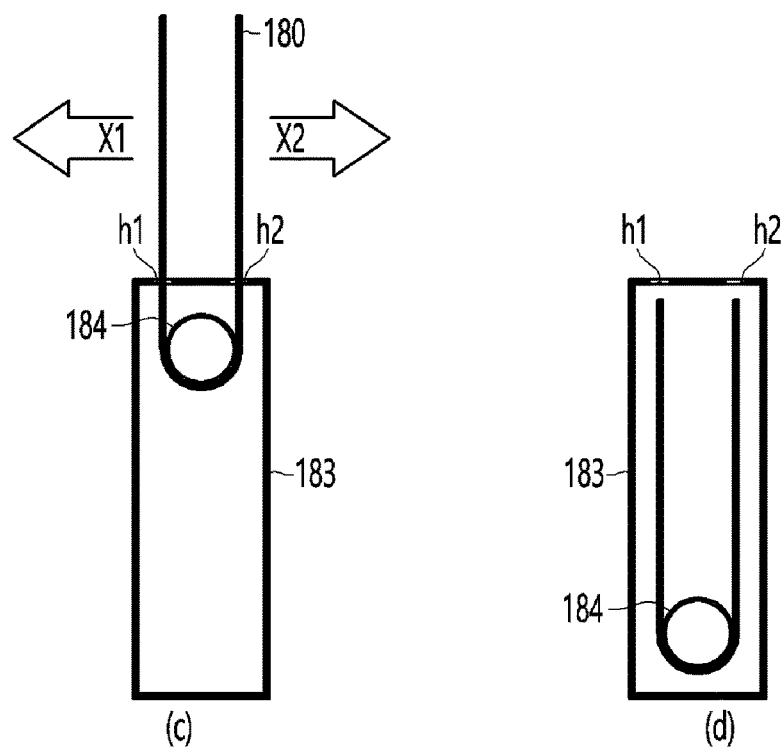

Next, FIG. 9 is a cross-sectional view showing an inside of a housing of a display device according to a second embodiment of the present disclosure.

Similar to the first embodiment, a display device 100 may include a housing 183, a display 180 that is retracted into and withdrawn from the housing 183, and a roller 184 that guides the display 180 to be rolled or unrolled. The display 180 may be a rollable display, and the rollable display may be a display that has sufficient enough elasticity to be greatly deformed.

The roller 184 is accommodated in the housing 183 and may rotate so that the display 180 is rolled or unrolled.

Meanwhile, in the housing 183, two or more holes h1 and h2 through which the display 180 is capable of being retracted/withdrawn may be formed. Referring to the example of FIG. 9, a first hole h1 and a second hole h2 may be formed in the housing 183. The first hole h1 is an opening through which the display 180 passes to output a screen in a first direction X1, and the second hole h2 is an opening through which the display 180 passes to output the screen in a second direction X2. As illustrated in FIG. 9, the first hole h1 and the second hole h2 may be formed on the top surface of the housing 183, but the positions of the holes h1 and h2 are only exemplary, and thus the present disclosure is limited thereto.

As shown in FIG. 9(a), when the roller 184 rotates in the R1 direction, the display 180 wound on the roller 184 passes through the first hole h1 and is withdrawn from the housing 183. The display 180 passing through the first hole h1 may form a screen to face the first direction X1.

In addition, when the roller 184 rotates in the R2 direction (a direction opposite to the R1 direction), the display 180 may be wound around the roller 184 and positioned inside the housing 183. Alternatively, when the roller 184 rotates in the R2 direction, the display 180 may be withdrawn from the housing 183 through the second hole h2 as shown in (b) of FIG. 9. For example, a switch (not shown) may be provided in the roller 184, and the display 180 may be wound around the roller 184 or withdrawn out to the outside of the housing 183 through any one of the and the second hole h2 according to the turning-on or off of the switch (not shown).

The display 180 withdrawn out to the outside of the housing 183 through the second hole h2 may form a screen to face the second direction X2. The second direction X2 may be opposite to the first direction X1.

When the roller 184 rotates in the R1 direction, the display 180 may be wound around the roller 184 or may be withdrawn out to the outside of the housing 183 through the first hole h1. Similarly, the display 180 is wound around the roller 184 or withdrawn out to the outside of the housing 183 through one of the first hole h1 and the second hole h2 by turning on or off a switch (not shown) provided in the roller 184. On the other hand, the switch (not shown) is merely exemplary, and the control unit 170 may control elements other than the roller 184 to determine whether to wind the display 180 around the roller 184 or withdraw the display 180 to the outside of the housing 183.

When the roller 184 rotates in the R1 direction, the display 180 is controlled to pass through the first hole h1, or when the roller 184 rotates in the R2 direction, the display 180 is controlled to pass through the second hole h2, so that the display 180 may form screens to face the first direction X1 and the second direction X2 as shown in FIG. 9(c). That is, the control unit 170 may control the roller 184 such that the display 180 simultaneously forms a screen facing the first direction X1 and a screen facing the second direction X2.

In this case, the control unit 170 may configure a screen in any one of the first direction X1 and the second direction X2, such that content is output in the forward direction and configure a screen in the other of the first direction X1 and the second direction X2 such that content is output in the reverse direction.

Specifically, since the display 180 illustrated in (c) of FIG. 9 is one display, among a display area withdrawn through the first hole h1 and a display area withdrawn through the second hole h2, one may be disposed in the forward direction, and the other may be disposed in the reverse direction. Accordingly, the control unit 170 may configure a screen such that, in one of the display area withdrawn through the first hole h1 and the display area withdrawn through the second hole h2, the upper end of content is displayed from the top of the relevant area, and in the other, the upper end of content is displayed from the bottom of the relevant area, thus allowing the content to be output in a forward direction in screens formed to face both directions.

Similarly, one display 180 may form a screen only in the first direction X1 as shown in FIG. 9(a) or form a screen in the second direction X2 as shown in FIG. 9(b), in any one thereof, the display area may be arranged in the reverse direction. The control unit 170 may configure the screen such that the upper end of the content is displayed from the top of the display area when the display area is arranged in the forward direction, and configure the screen such that the upper end of the content is displayed from the bottom of the display area when the display area is arranged in the reverse direction.

That is, when outputting content on the display area arranged in the reverse direction, the control unit 170 may output the content by turning a transmitted image up and down.

As described through (a) to (c) of FIG. 9, the control unit 170 may control roller 184 such that the screen of the display 180 is formed to face at least one of the first direction X1 and the second direction X2.

Meanwhile, according to an embodiment, the roller 184 may be elevated or lowered within the housing 183. The display display 100 may further include an elevating module (not shown) for elevating the roller 184 inside the housing 183. As shown in (d) of FIG. 9, when the roller 184 is lowered to the minimum height in the housing 183, the display 180 may be entirely disposed inside the housing 183. Meanwhile, unlike in (d) of FIG. 9, the display 180 may be entirely wound around the roller 184 to be disposed inside the housing 183.

Meanwhile, although not shown in FIG. 9, the display device 100 may further include a cover (not shown) for protecting the display 180.

Figure 10:
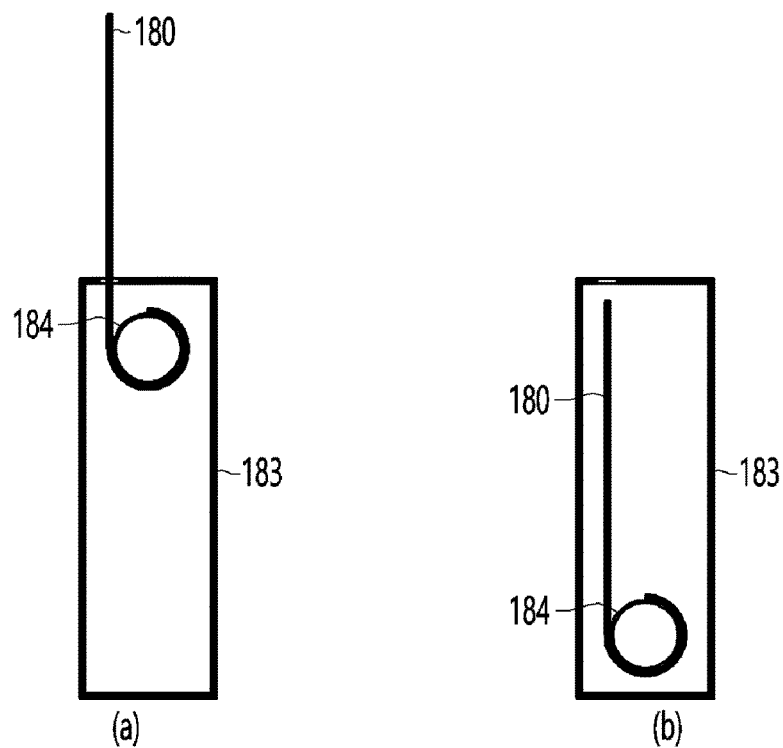
FIGS. 10 and 11 are diagrams illustrating examples of various methods by which the display of a display device is retracted into/withdrawn from the housing, according to the first or second embodiment of the present disclosure.
Figure 10:
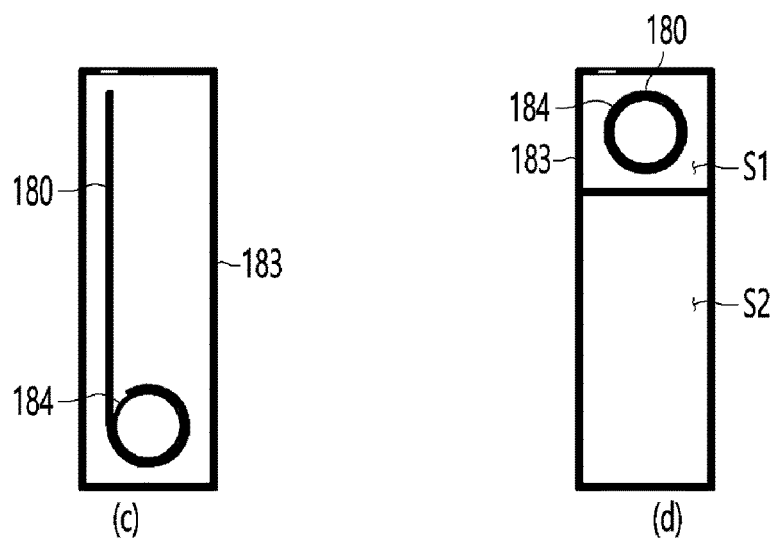
Figure 11:
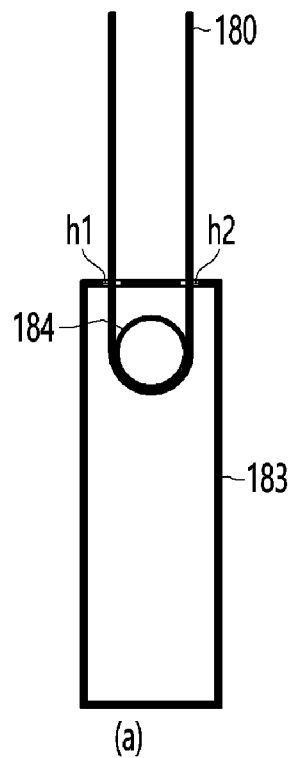
Figure 11:
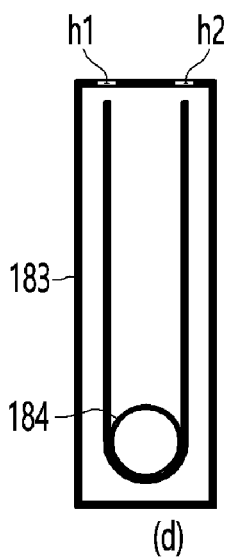
Figure 11:
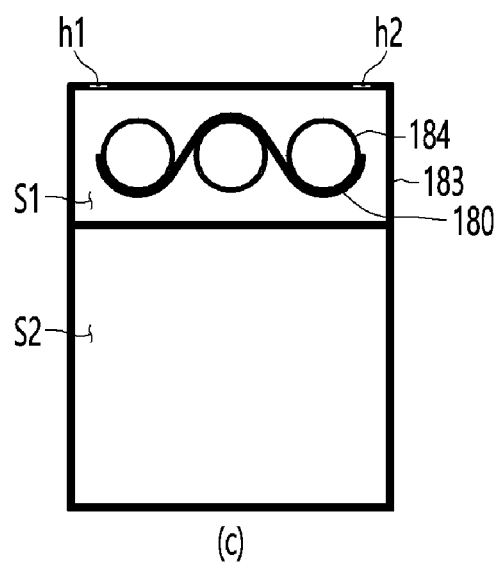

FIGS. 10 and 11 are diagrams illustrating examples of various methods by which the display of a display device is retracted into/withdrawn from the housing, according to the first or second embodiment of the present disclosure.

Although it is shown in the example of FIG. 10 that only one hole through which the display 180 is retracted/withdrawn is formed in the housing 183, this is only an example for convenience of description, and the method of FIG. 10 may be applied even when two or more holes are formed in the housing 183.

As shown in (a) of FIG. 10, the display 180 withdrawn from the housing 183 may be hidden inside the housing 183 by any one of the methods shown in (b), (c) and (d) of FIG. 10.

In FIG. 10, (b) may be an example of a method of retracting/withdrawing the display 180 into/from the housing 183 by adjusting the height of the roller 184. A space in which the roller 184 is elevated/lowered may be formed inside the housing 183, and the display 180 may exist inside or outside the housing 183 depending on the height of the roller 184. For example, when the roller 184 is elevated, the display 180 is withdrawn from the housing 183, and when the roller 184 is lowered, the display 180 may be retracted into the housing 183.

In FIG. 10, (c) may be an example of a method of retracting/withdrawing the display 180 into/from the housing 183 by adjusting the rotation and height of the roller 184. A space in which the roller 184 is elevated may be formed inside the housing 183, so that the length of the display 180 withdrawn from the housing 183 may be changed according to the height of the roller 184, and at the same time, the length of the display 180 withdrawn from the housing 183 may be changed according to the rotation of the roller 184 That is, in the display 180, the length of the display 180 withdrawn from the housing 183 may be changed by adjustment of the rotation of the roller 184 and the height of the roller 184. In this case, even if the space in which the rollers 184 formed in the housing 183 is elevated and lowered is relatively narrow, the display 180 may be retracted into the housing 183 as the rotation of the rollers 184 is used together.

In FIG. 10, (d) may be an example of a method of retracting/withdrawing the display 180 into/from the housing 183 only by rotating the roller 184. A mounting space S1 and a receiving space S2 in which the roller 184 and the display 180 exist may be formed inside the housing 183. The mounting space S1 and the receiving space S2 may be divided.

In the mounting space S1, the roller 184 may rotate, and by the rotation of the roller 184, the display 180 may be retracted into the housing 183 or withdrawn from the housing 183.

The receiving space S2 may be a space remaining except for the mounting space S1. For example, the receiving space S2 may be formed under the mounting space S1, but the location of the receiving space S2 is merely exemplary. Various items may be received in the receiving space S2. In this case, there is an advantage that the remaining space of the housing 183 may be utilized in various ways.

In particular, FIG. 11 may be a method by which the display 180 capable of being retracted/withdrawn in both directions is retracted into/withdrawn from the housing 183. As shown in (a) of FIG. 11, the display 180 withdrawn through the first and second holes h1 and h2 of the housing 183 may be hidden inside the housing 183 by the methods shown in (b) or (c) of FIG. 11.

In FIG. 11, (b) may be an example of a method of retracting/withdrawing the display 180 into/from the housing 183 by adjusting the height of the roller 184. A space in which the roller 184 is elevated/lowered may be formed inside the housing 183, and the display 180 may exist inside or outside the housing 183 depending on the height of the roller 184. For example, when the roller 184 is elevated, the display 180 is withdrawn from the housing 183 to form screens in both directions, and when the roller 184 is lowered, the display 180 may be retracted into the housing 183.

In FIG. 11, (c) may be an example of a method of retracting/withdrawing the display 180 into/from the housing 183 through a plurality of rollers 184. The plurality of rollers 184 may be provided inside the housing 183, and as the plurality of rollers 184 rotate, the display 180 may be wound or unwound on the roller 184, and the display 180 may be retracted into/withdrawn from housing 183. In this case, the housing 183 may include a mounting space S1 provided with the plurality of rollers 184 and the receiving space S2 excluding the mounting space S1.

As described above, the roller 184 may be driven to rotate or be elevated, and the display 180 may be withdrawn from/retracted into the housing 183 by driving the roller 184.

In addition, the roller 184 may be driven such that the display 180 forms a screen to face at least one of the first direction and the second direction.

Figure 12:
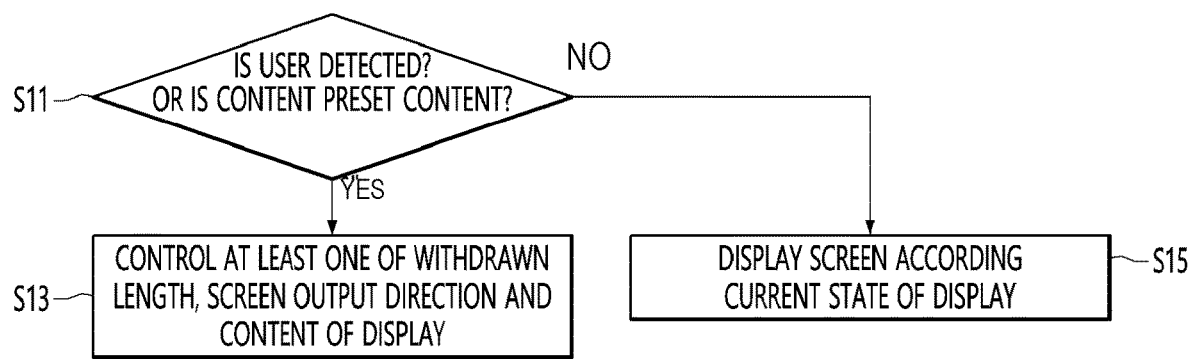
FIG. 12 is a flowchart showing a method of operating a display device according to an embodiment of the present disclosure.

FIG. 12 is a flowchart showing a method of operating a display device according to an embodiment of the present disclosure.

The control unit 170 may detect a user or detect whether the content is a preset content (S11).

The control unit 170 may set each condition and a corresponding state in advance such that the display 180 operates in a state set corresponding to a specific condition, when the specific condition is satisfied.

For example, the specific condition may include a case in which a user exists in the vicinity of the display device 100, a case in which content corresponds to a preset content, or the like, but these are only exemplary and is not limited thereto. In the example of FIG. 12, it is assumed that the specific condition corresponds to a case in which content corresponds to a preset content when a user exists around the display device 100.

Meanwhile, the display device 100 may further include a sensor unit (not shown) for detecting a user.

According to a first embodiment, the sensor unit (not shown) may be configured with a radar. The radar may detect a user by emitting an electromagnetic wave and then receiving the reflected electromagnetic wave. The radar may detect the presence or absence of a user in the vicinity of the display device 100, a spaced distance from the user, and the like.

According to a second embodiment, the sensor unit (not shown) may be configured with a camera. The camera may capture an image around the display device 100, and the control unit 170 may detect a motion by analyzing the captured image.

Meanwhile, the above-described embodiments are merely examples for convenience of description, and the sensor unit (not shown) may detect the user in various ways through various configurations. The control unit 170 may detect a location of the user, a distance from the user, the number of users, and the like through the sensor unit (not shown). In addition, the above-described first embodiment and the second embodiment may be implemented separately or may be implemented in combination.

When the control unit 170 may detect the user or content is a preset content, the control unit 170 may adjust at least one of a withdrawal length, a screen output direction, and content of the display 180 (S13).

That is, when a specific condition is satisfied, the control unit 170 may adjust at least one of a withdrawal length, a screen output direction, and content of the display 180.

Next, a method of adjusting at least one of a withdrawal length, a screen output direction, and content of the display 180 according to a current condition in the display device 180 according to an embodiment of the present disclosure is described with reference to FIGS. 13 to 24.

Figure 13:
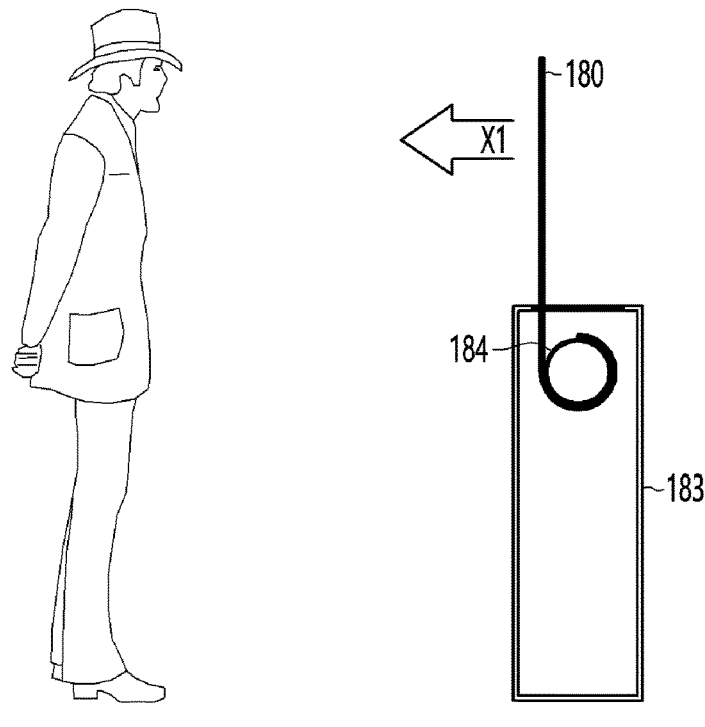
FIG. 13 is an exemplary diagram illustrating a method of determining a screen output direction based on a direction in which a user is detected in a display device according to an embodiment of the present disclosure.
Figure 13:
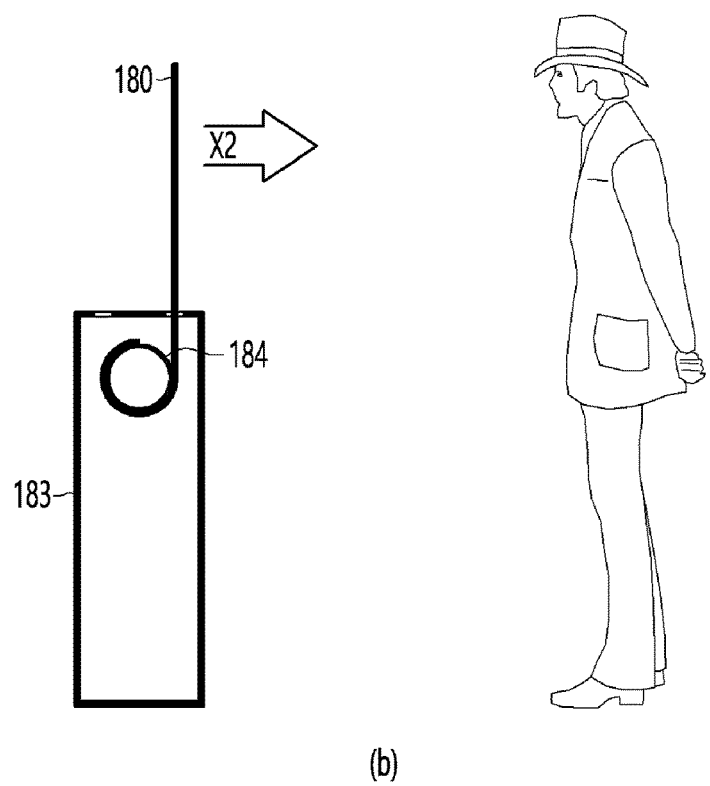

FIG. 13 is an exemplary diagram illustrating a method of determining a screen output direction based on a direction in which a user is detected in a display device according to an embodiment of the present disclosure.

The control unit 170 may determine the screen output direction of the display 180 based on the detection result of the sensor unit (not shown). In particular, the control unit 170 may control the roller 184 such that a direction in which the user is located matches the screen output direction.

For example, as shown in (a) of FIG. 13, if the direction in which the user is located is the first direction X1, the control unit 170 may withdraw the display 180 such that the screen is output in the first direction X1 and, as shown in (b) of FIG. 13, if the direction in which the user is located is the second direction X2, withdraw the display 180 such that the screen is output in the second direction X2.

In this case, since the display 180 is automatically withdrawn in the direction in which the user is located, there is an advantage that the user is able to use the display device 100 more conveniently.

FIG. 13 is an exemplary diagram illustrating a method of determining a screen output direction based on a direction in which a user's face is detected in a display device according to an embodiment of the present disclosure.

The control unit 170 may determine the screen output direction of the display 180 based on the detection result of the sensor unit (not shown). In particular, the control unit 170 may determine the direction in which the user's face is detected as a screen output direction. Accordingly, the control unit 170 may control the roller 184 such that the direction in which the user's face is detected matches the screen output direction.

Figure 14:
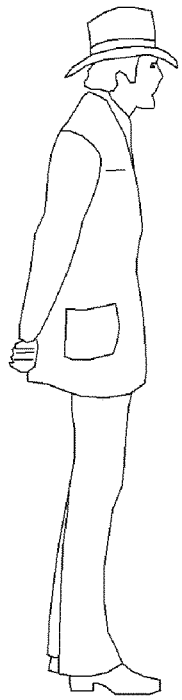
FIG. 14 is an exemplary diagram illustrating a method of determining a screen output direction based on a direction in which a user is detected in a display device according to an embodiment of the present disclosure.
Figure 14:
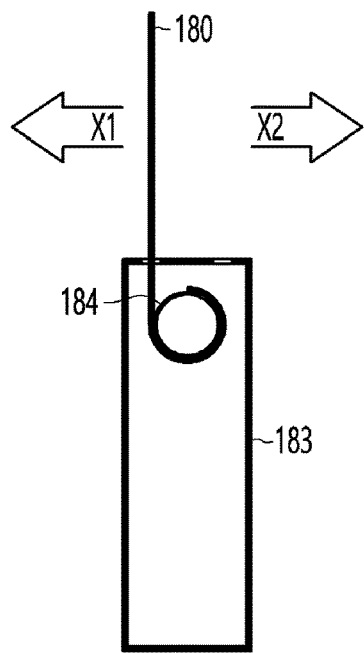
Figure 14:
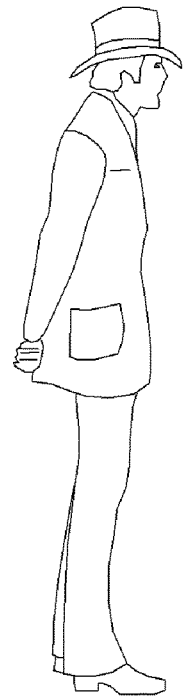
Figure 14:
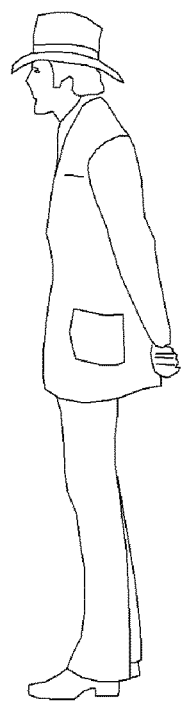
Figure 14:
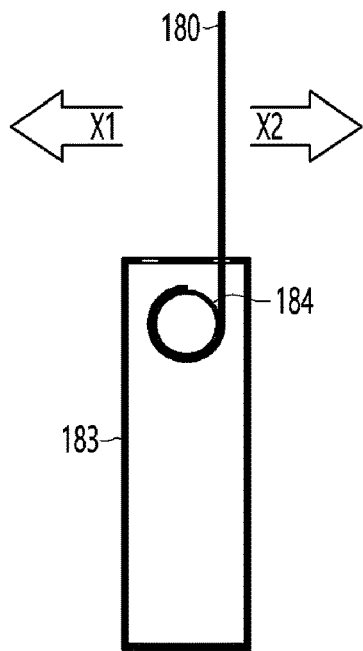
Figure 14:
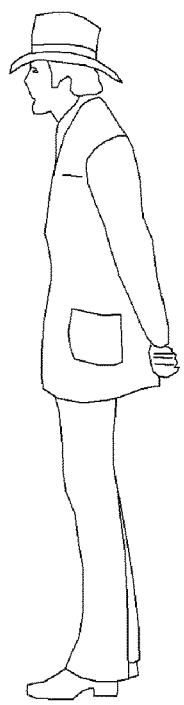

For example, as shown in FIG. 14(*a*), when the control unit 170 detects users both in the first direction X1 and the second direction X2, but detects the user's face in the first direction X1, the control unit 170 may withdraw the display 180 such that a screen is output to face the first direction X1. As shown in (b) of FIG. 14, when the control unit 170 detects users both in the first direction X1 and the second direction X2, but detects the user's face in the second direction X2, the control unit 170 may withdraw the display 180 such that a screen is output to face the second direction X2.

When a plurality of user faces are detected, the control unit 170 may recognize a direction of a face facing the display 180 from among the plurality of user faces, and withdraw the display 180 to face the recognized direction.

According to an embodiment, the control unit 170 may determine the screen output direction by detecting the user's face only when a plurality of users are detected around the display device 100.

According to another embodiment, the control unit 170 may determine the screen output direction by detecting the user's face regardless of the number of users detected around the display device 100.

In addition, when there are a plurality of users detected by a sensor unit (not shown) in the above-described embodiments, the control unit 170 may determine a screen output direction based on a user located closest to the plurality of users.

In this case, since the display 180 is automatically withdrawn in the direction in which the user's face is detected, a user who is looking at the display device 100 can be recognized and an environment in the recognized user can easily view the display device 100 can be provided.

Figure 15:
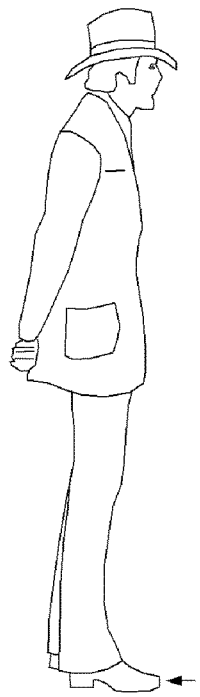
FIG. 15 is an exemplary diagram illustrating a method of adjusting a withdrawal length of a display based on a distance from a user in a display device, according to an embodiment of the present disclosure.
Figure 15:
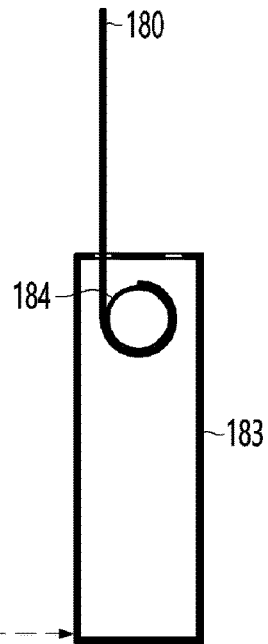
Figure 15:
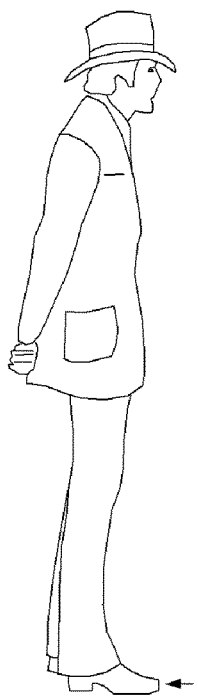
Figure 15:
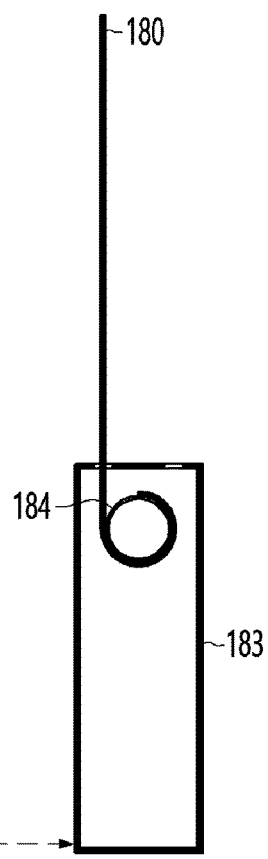

FIG. 15 is an exemplary diagram illustrating a method of adjusting a withdrawal length of a display based on a distance from a user in a display device, according to an embodiment of the present disclosure.

The control unit 170 may detect a distance from a user through a sensor unit (not shown). The distance from the user may mean a distance from the display device 100 to the user. The control unit 170 may adjust the withdrawal length of the display 180 according to the distance from the user.

For example, when the distance from the user is less than a preset distance, the control unit 170 may control the roller 184 such that the display 180 is withdrawn out to a preset reference length or more. The reason for this is that, when the user is located very close to the display device 100, the display 180 is highly likely to be positioned lower than the user's eye level.

As shown in FIG. 15(*a*), the control unit 170 may control the roller 184 such that the display 180 is withdrawn out to a reference length when a distance d1 to the user is greater than or equal to a preset distance. As shown in (b) of FIG. 15, the control unit 170 may control the roller 184 such that the display 180 is withdrawn out to the reference length or more when a distance d2 to the user is greater than or equal to the present distance. In this case, the reference length may mean a withdrawal length of the display when the aspect ratio of a withdrawn display area matches the image ratio of a general broadcast image.

In this case, since the image is output to match the user's eye level even if the user is located very close to the display device 100, there is an advantage that the user can view content more comfortably. That is, the display device 100 has the advantage of providing visual comfort by maintaining a user's viewing angle regardless of the user's location.

Also, the control unit 170 may adjust a withdrawal length of the display 180 according to the user's eye level. When the sensor unit (not shown) is a camera, the control unit 170 may detect the user's eye level through the sensor unit (not shown). The control unit 170 may control the display 180 such that the user's eye level matches the center of content. In this case, there is an advantage in that the content can be output to allow the user to view the content conveniently regardless of the user's height.

On the other hand, when the display 180 is withdrawn beyond the reference length, the control unit 170 may adjust the output size of the content or the output position of the content according to the type of the output content.

Figure 16:
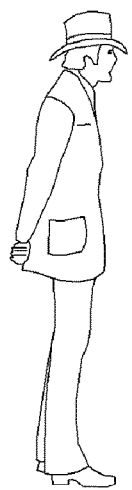
FIG. 16 is an exemplary diagram illustrating a method of outputting content when a display device withdraws a display to a preset length or more according to an embodiment of the present disclosure.
Figure 16:
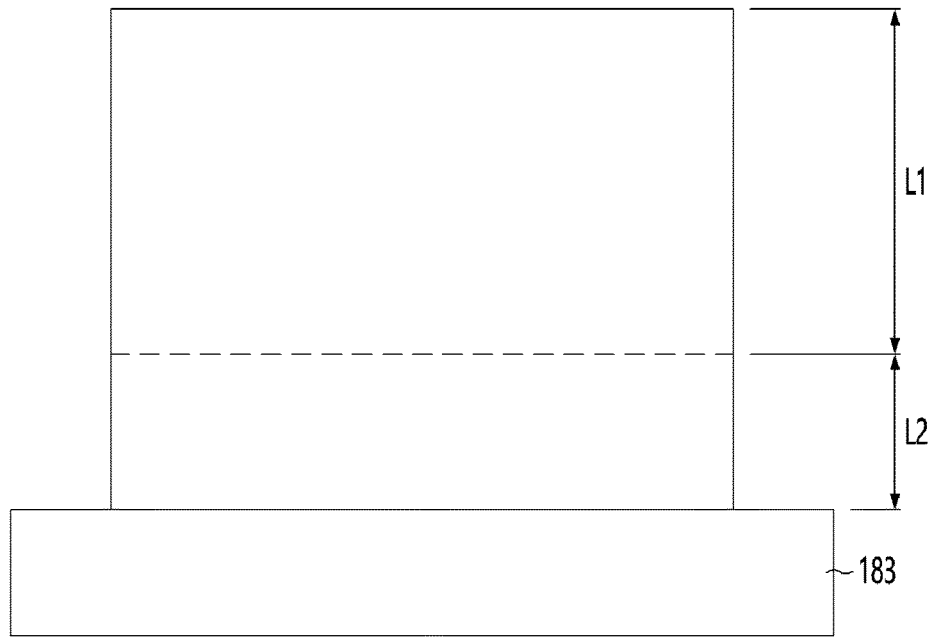
Figure 16:
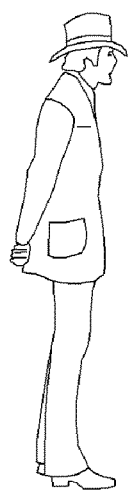
Figure 16:

FIG. 16 is an exemplary diagram illustrating a method of outputting content when a display device withdraws a display to a preset length or more according to an embodiment of the present disclosure.

As described with reference to FIG. 15, when the distance from the user is less than a preset distance, the control unit 170 may withdraw the display 180 to a reference length or more.

In the example of FIG. 16, it may be assumed that the reference length is L1, and the additionally-withdrawal length according to the distance from the user is L2. That is, when the distance from the user is greater than or equal to the preset distance, the control unit 170 may withdraw the display 180 to L1, and when the distance from the user is less than the preset distance, the control unit 170 may additionally withdraw the display 180 from L1 to L2, that is, to L3 (=L1+L2).

When the display 180 is withdrawn out to a preset reference length or more, the control unit 170 may adjust the number of pieces of content output to a screen according to the image ratio of first content. Here, the first content may be content selected by the user to be output on the screen.

When the first content is content having a fixed image ratio, the control unit 170 may further display second content in addition to the first content on the screen, and when the first content does not have a fixed image ratio, the control unit 170 may control the display 180 to display only the first content on the screen.

For example, when the first content is content having a fixed image ratio, the control unit 170 may divide the display 180 into a first area (area corresponding to L1) and a second area (area corresponding to L2) as shown in (a) of FIG. 16 and display the first content on the first area and the second content on the second area. That is, the control unit 170 may elevate and display the first content by the additionally-withdrawal length L2 and further display the second content in a remaining area other than the area in which the first content is output. As described above, when the first content is output at a higher position, the user's eye level and the central part of the image are matched, enabling the user to easily view the first content. In addition, by outputting the second content to the remaining area except for the first content, there is an advantage in that various information as well as the first content requested by the user may be provided to the user. For example, the second content may be an image or text such as an advertisement or an alarm. The second content may be set in advance.

However, when the first content is not the content having a fixed image ratio, the control unit 170 may enlarge the first content as shown in FIG. 16(b) and display the first content in the entire display area (area corresponding to L3). For example, when an image that does not require a fixed image ratio, such as an image of flying petals, is the first content, the control unit 170 may display only the first content on the display 180 withdrawn by additional withdrawal. On the other hand, in this case, the control unit 170 may analyze the first content before reproducing the first content and withdraw the display 180 to a reference length or more in advance, thus shortening the amount of time required for the display 180 to be additionally withdrawn.

Next, the display device 100 according to an embodiment of the present disclosure may adjust the size of a user interface (UI) output on the screen according to the distance from the user.

Figure 17:
FIG. 17 is an exemplary diagram illustrating a method of adjusting content based on a distance from a user in a display device according to an embodiment of the present disclosure.
Figure 17:
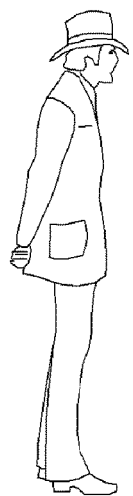

FIG. 17 is an exemplary diagram illustrating a method of adjusting content based on a distance from a user in a display device according to an embodiment of the present disclosure.

In FIG. 17, it is assumed that the content is a user interface (UI), but this is only given as an example for convenience of description, and it is apparent that the present disclosure is not limited to the content type.

The control unit 170 may control the display 180 so that the size of the UI in a case where the distance from the user is less than the preset distance is smaller than the size of the UI in a case where the distance from the user is greater than or equal to the preset distance. Referring to the example of FIG. 17, the withdrawal length of the display 180 in FIG. 17(a) and the withdrawal length of the display 180 in FIG. 17(b) may be the same as L4. However, the control unit 170 may control the display 180 such that the size of the UI (e.g., TEXT) in a case where the distance from the user is greater than or equal to the preset distance as shown in FIG. 17(a) is larger than the size of the UI (e.g., TEXT) in a case where the distance from the user is less than the preset distance as shown in FIG. 17(b).

That is, the display device 100 may output a larger size of UI when the user is located far from the display device 100, and thus the user can easily view the display device 100 even at a far position.

Meanwhile, as described above, the display device 100 may not only adjust the size of the UI to the first size (the size shown in FIG. 17(a)) or the second size (the size shown in FIG. 17(b)) based on the preset distance but also adjust the size of the UI in proportion to the distance from the user. That is, the control unit 170 may control the roller 184 to increase the withdrawal length of the display 180 in proportion to the distance from the user.

That is, according to another embodiment, the control unit 170 may increase the size of the UI in proportion to the distance from the user.

Also, the control unit 170 may adjust the volume of sound output from the audio output unit 185 based on the distance from the user. That is, according to an embodiment, the control unit 170 may control the volume of sound such that the sound volume in a case where the distance from the user is greater than or equal to the preset distance is larger than the sound volume in a case where the distance from the user is less than the preset distance According to another embodiment, the control unit 170 may increase the volume of the sound output from the audio output unit 185 in proportion to the distance from the user.

Figure 18:
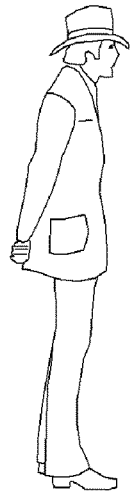
FIG. 18 is an exemplary diagram illustrating a modification of the method of adjusting content based on a distance to a user in a display device according to an embodiment of the present disclosure.
Figure 18:
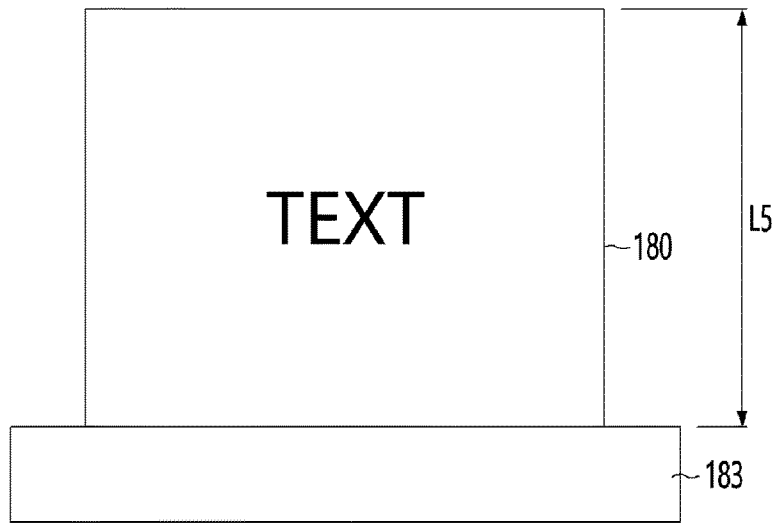
Figure 18:
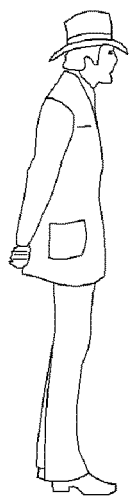
Figure 18:
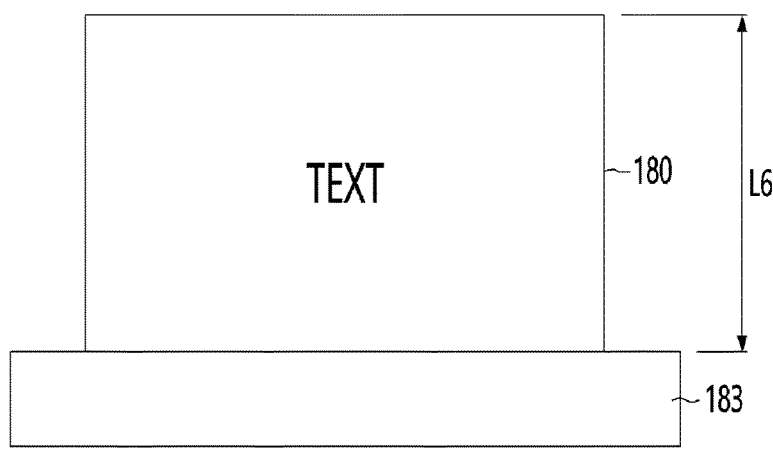

FIG. 18 is an exemplary diagram illustrating a modification of the method of adjusting content based on a distance to a user in a display device according to an embodiment of the present disclosure.

As described with reference to FIG. 17, the control unit 170 may adjust the size of the UI according to the distance from the user, and also adjust the withdrawal length of the display 180 when the size of the UI is adjusted.

Referring to the example of FIG. 18, the control unit 170 may control the display 180 such that the size of the UI in a case where the distance from the user is greater than or equal to the preset distance as shown in FIG. 18(a) is larger than the size of the UI in a case where the distance from the user is less than the preset distance as shown in FIG. 18(b) and at the same time, control the roller 184 such that the withdrawal length L5 of the display 180 in a case where the distance from the user is greater than or equal to the preset distance as shown in FIG. 18(a) is longer than the withdrawal length L6 of the display 180 in a case where the distance from the user is less than the preset distance as shown in FIG. 18(*b*)

That is, when the user is located far away from the display device 100, the display device 100 may output a larger size of the UI and at the same time, further withdraw the display 180 from the housing 183, thus withdrawing the UI and the other content together.

In addition, the control unit 170 may adjust the withdrawal length of the display 180 according to the content output to the screen.

For example, the control unit 170 may set content in which at least one of the withdrawal length, the screen output direction, and the content of the display 180 is adjusted, in advance. When the content is preset content, the control unit 170 may adjust at least one of the withdrawal length, the screen output direction, and the content of the display 180.

For example, when the content output to the screen is advertisement content, the control unit 170 may increase the withdrawal length of the display 180 as the distance from the user is shorter.

Figure 19:
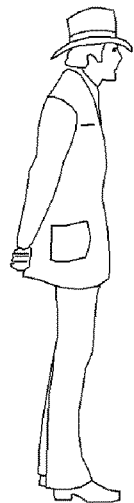
FIG. 19 is a diagram illustrating an example of a method of increasing a withdrawal length of a display according to the content in a display device according to an embodiment of the present disclosure.
Figure 19:
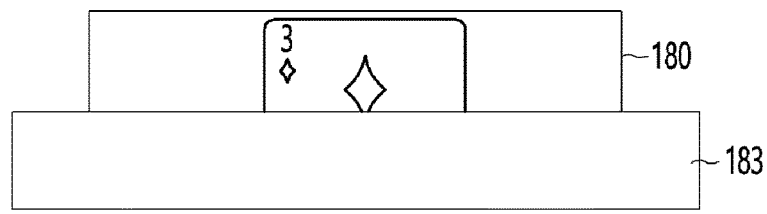
Figure 19:
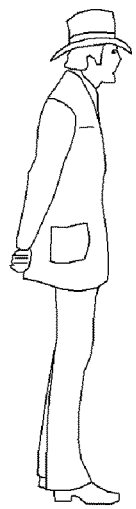
Figure 19:
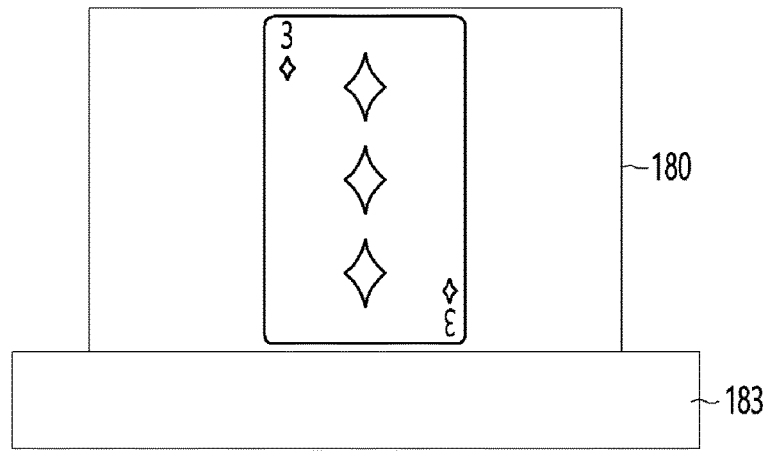

FIG. 19 is a diagram illustrating an example of a method of increasing a withdrawal length of a display according to the content in a display device according to an embodiment of the present disclosure.

The control unit 170 may detect a distance from a user, and increase a withdrawal length of the display 180 as the distance from the user is shorter as shown in FIG. 19. That is, the control unit 170 may increase the withdrawal length of the display 180 in inverse proportion to the distance from the user.

In this case, the display device 100 may allow the user to recognize that the withdrawal length of the display 180 increases as the user approaches the display device 100, increasing the degree of interest in the content output from the display 180, and thus maximizing advertising effect and the like.

Meanwhile, as another example, when the content output to the screen is content having an image ratio in which a vertical length is long with respect to a horizontal length, the control unit 170 may increase the withdrawal length of the display 180.

Figure 20:
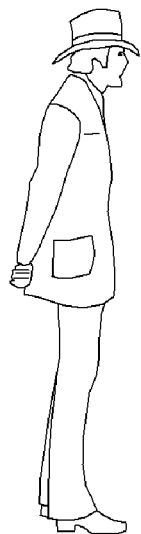
FIG. 20 is a diagram illustrating another example of a method of increasing a withdrawal length of a display according to the content in a display device according to an embodiment of the present disclosure.
Figure 20:
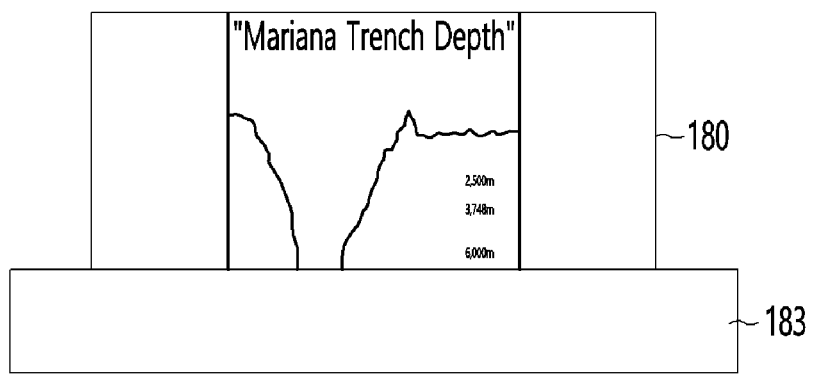
Figure 20:
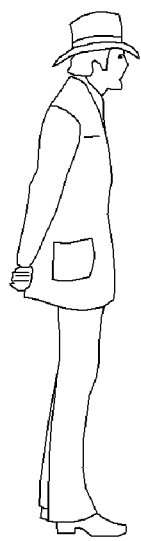
Figure 20:
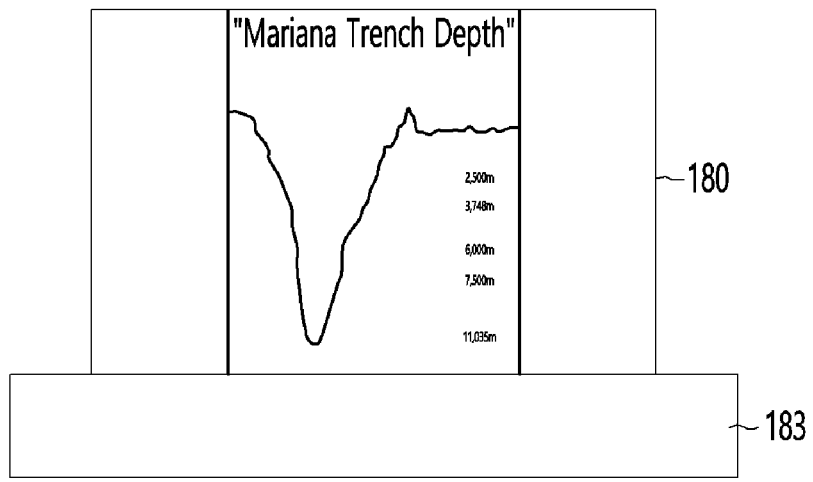

FIG. 20 is a diagram illustrating another example of a method of increasing a withdrawal length of a display according to the content in a display device according to an embodiment of the present disclosure.

According to the example of FIG. 20, the control unit 170 may control the roller 184 such that the display 180 is withdrawn beyond a reference length according to content. Referring to the example shown in FIG. 20, the content to be output by the display 180 may be content having an image ratio in which a vertical length is long with respect to a horizontal length. In this case, the control unit 170 may control the roller 184 such that the length of the display 180 is the reference length or more, and in this case, the entire content may be displayed.

In addition, the control unit 170 may adjust the withdrawal direction of the display 180 according to the content output on the screen.

For example, when the content output to the screen is a game, the control unit 170 may control the roller 184 so that screens are formed to face the first direction and the second direction, respectively.

FIGS. 21 to 24 are exemplary diagrams illustrating a method of adjusting an withdrawal direction of a display according to a content output to a screen in a display device according to an embodiment of the present disclosure.

Figure 21:
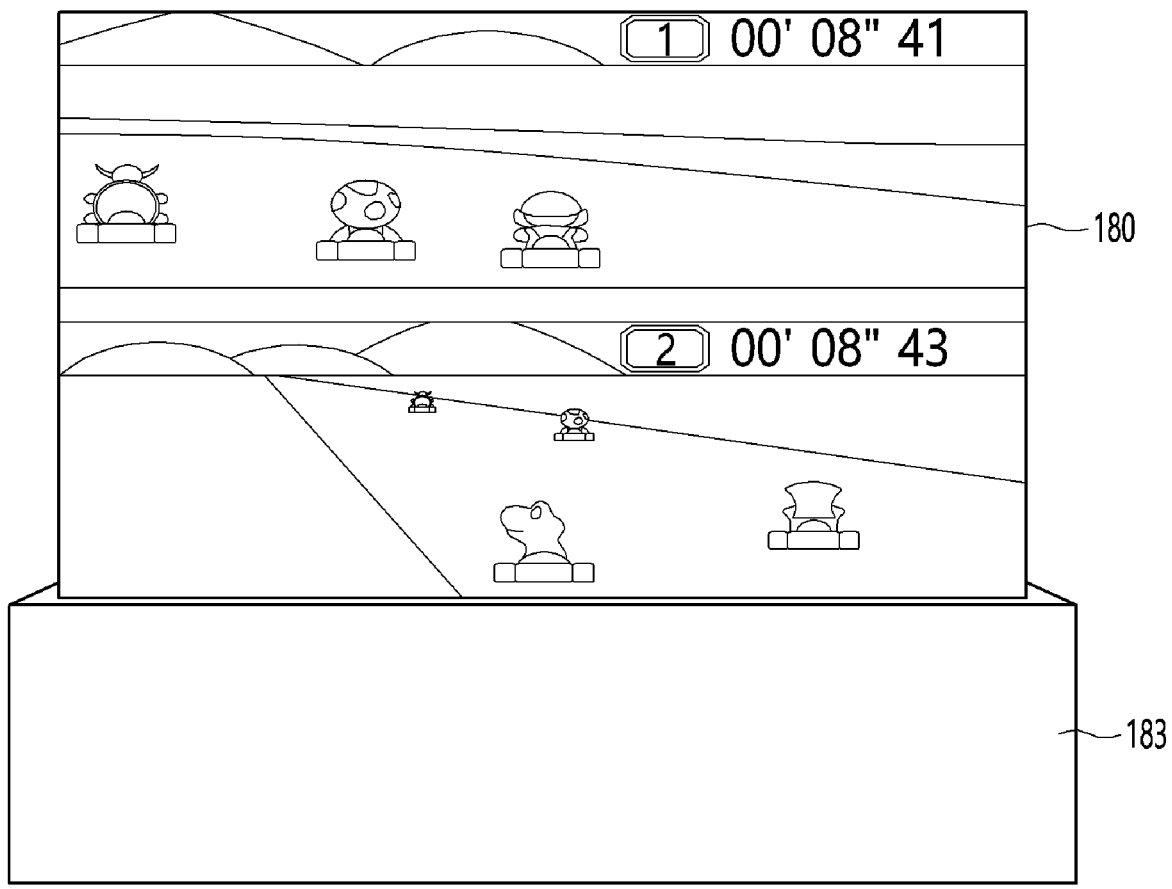
FIGS. 21 to 24 are exemplary diagrams illustrating a method of adjusting an withdrawal direction of a display according to a content output to a screen in a display device according to an embodiment of the present disclosure.
Figure 22:
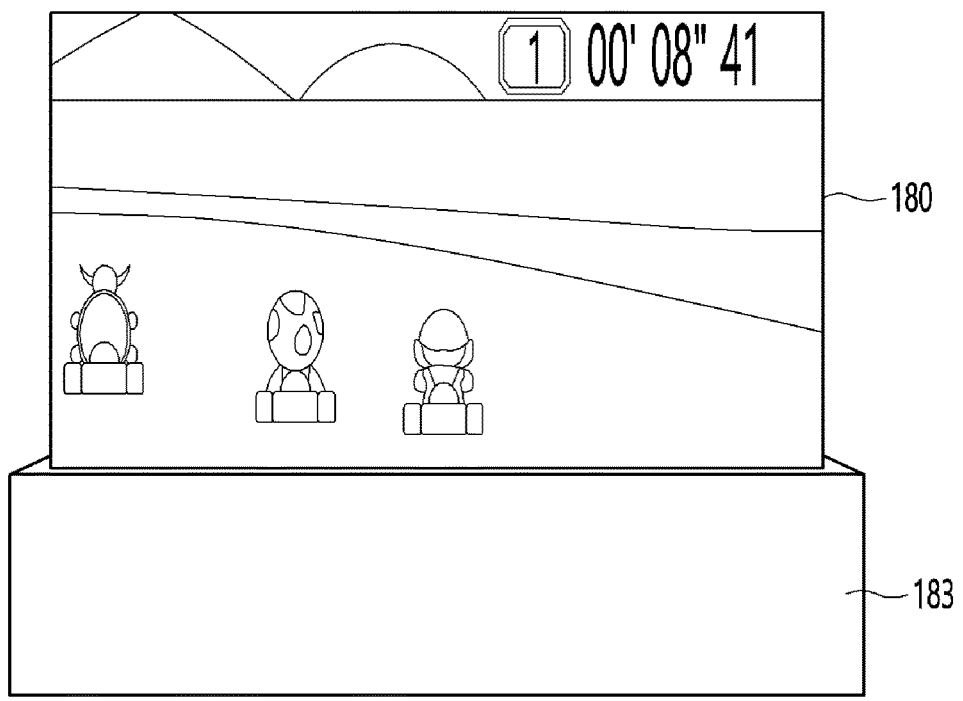
Figure 22:
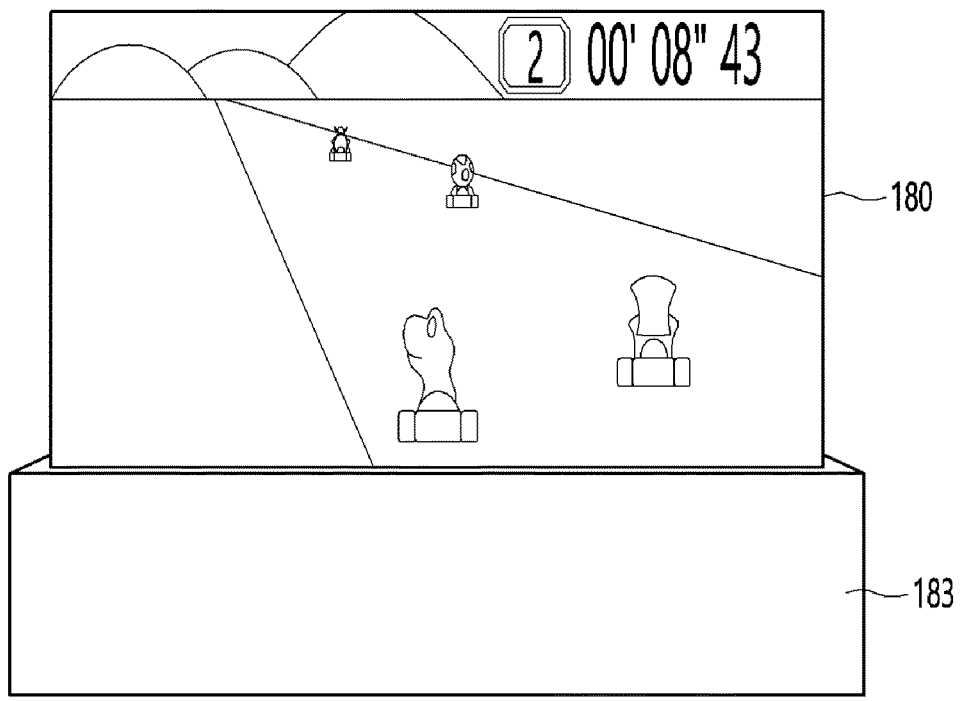

When the content output to the display 180 is divided into an image of an upper region and an image of a lower region as shown in FIG. 21, the control unit 170 may control the display 180 and the roller 184 such that the image of the upper region is output on a screen formed to face the first direction X1 and the image of the lower region is output on a screen formed to face the second direction X2 as shown in FIG. 22.

In this case, the control unit 170 may adjust the aspect ratio of the content. For example, when the content is vertically divided as shown in FIG. 21, the control unit 170 may control the display 180 to withdraw the vertical length of an original image two times and output the divided content to screens respectively. For example, when the image ratio of the images of the upper region and the image of the lower region in the original image is 1920×540, the control unit 170 may control the display 180 to output an enlarged image with 1920×1080 in each of the screen formed to face the first direction X1 and the screen formed to face the second direction X2.

Figure 23:
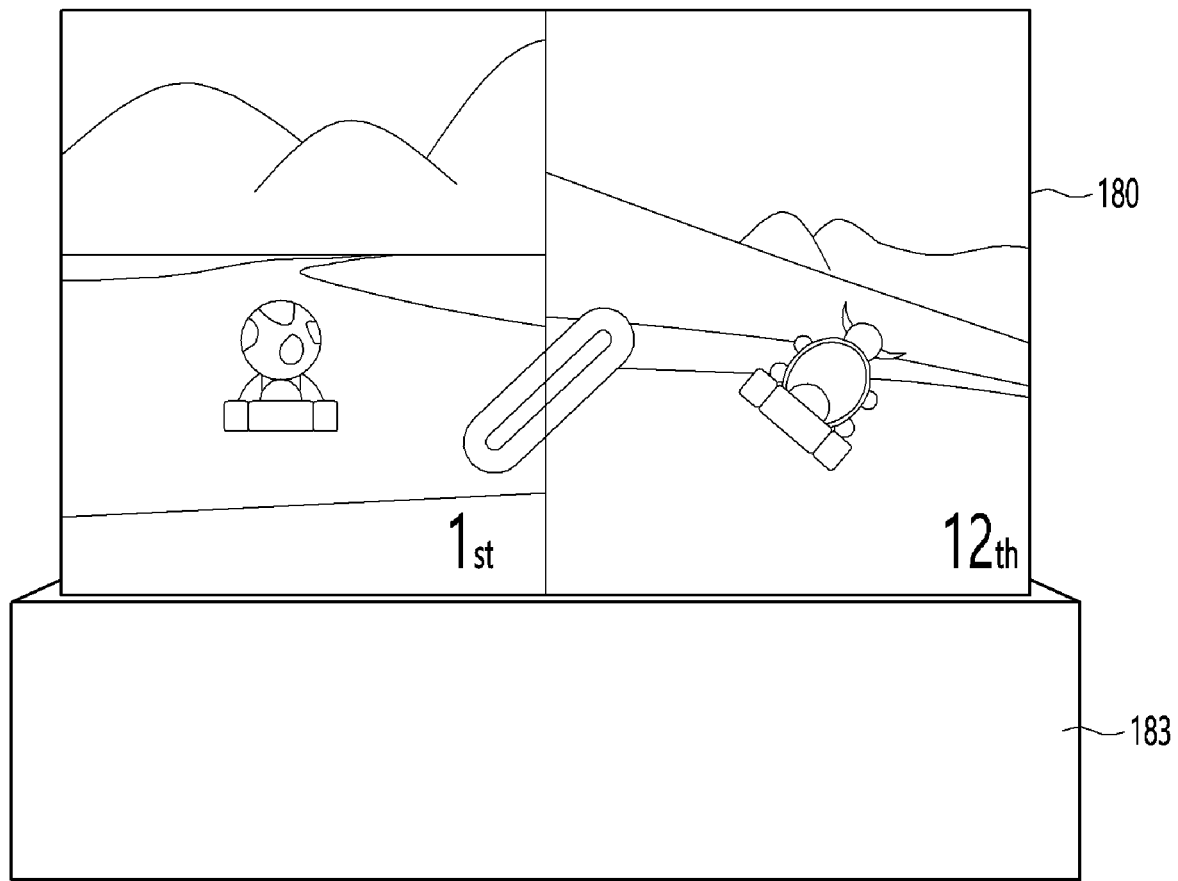
Figure 24:
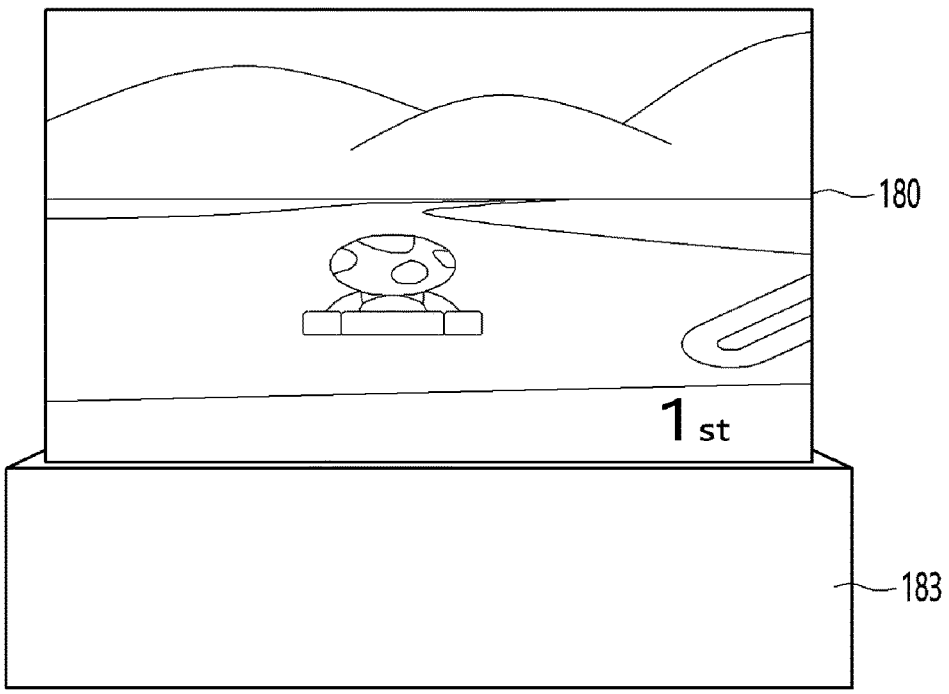
Figure 24:
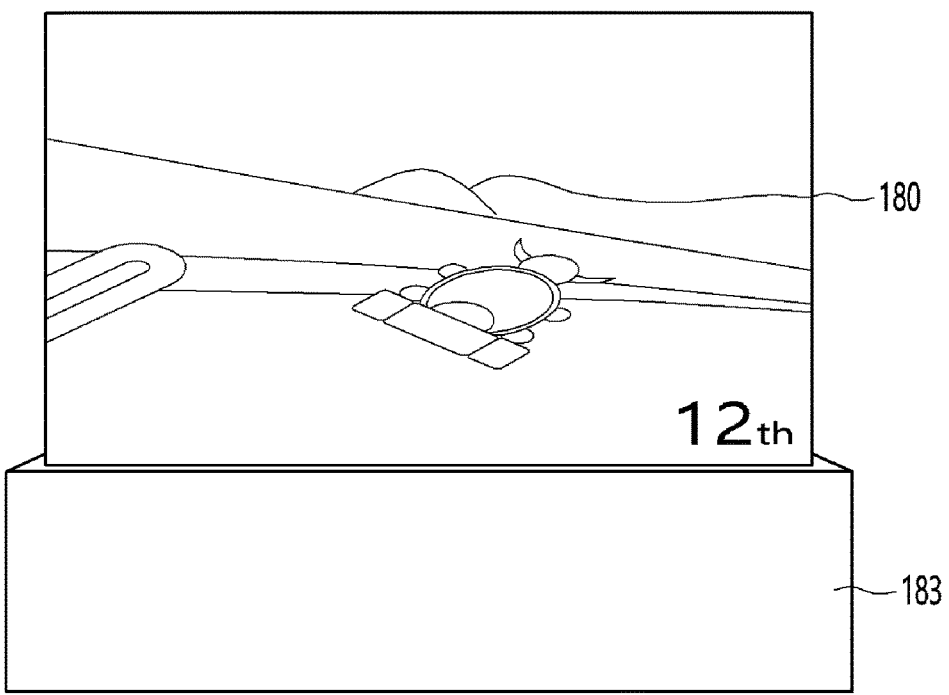

Similarly, when the content output to the display 180 is divided into an image of a left region and an image of a right region as shown in FIG. 23, the control unit 170 may control the display 180 and the roller 184 such that the image of the left region is output on a screen formed to face the first direction X1 and the image of the right region is output on a screen formed to face the second direction X2 as shown in FIG. 24.

In this case, the control unit 170 may adjust the aspect ratio of the content. For example, when the content is horizontally divided as shown in FIG. 23, the control unit 170 may control the display 180 to withdraw the horizontal length of an original image two times and output the divided content to screens respectively. For example, when the image ratio of the images of the left region and the image of the right region in the original image is 1920×1080, the control unit 170 may control the display 180 to output an enlarged image with 1920×1080 in each of the screen formed to face the first direction X1 and the screen formed to face the second direction X2.

When the control unit 170 outputs the vertically-divided or horizontally-divided content as shown in FIG. 21 or FIG. 23 in a state in which the display 180 is withdrawn such that the screen is formed to face only a single direction, the control unit 170 may control the display 180 such that a screen is formed to face both directions as shown in FIG. 22 or FIG. 24. In this case, the user can view an enlarged image instead of a small image due to the division, thereby enabling the user to view the content easily and focus on the content.

Meanwhile, by analyzing the image displayed on the screen, the control unit 170 may control the roller 184 such that screens are formed to face the first direction and the second direction, respectively when the image is recognized as divided content. For example, when the image displayed on the screen is recognized as divided game content, the control unit 170 may control the roller 184 such that screens are formed to face the first direction and the second direction, respectively.

Alternatively, the control unit 170 may control the roller 184 such that screens are formed to face the first direction and the second direction according to a connected external device. For example, when an external device such as a game console is connected, the control unit 170 may control the roller 184 such that screens are formed to face the first direction and the second direction, respectively.

Meanwhile, the control unit 170 may receive an input for selecting whether to display a screen in both directions may be received from the user before changing the screen shown in FIG. 21 to the screen shown in FIG. 22 or before changing the screen shown in FIG. 23 to the screen shown in FIG. 24. In this case, when receiving an input for determining to display a screen in both directions, the control unit 170 may change the screen as shown in FIG. 21 to the screen shown in FIG. 22 or change the screen as shown in FIG. 23 to the screen shown in FIG. 24. However, when the control unit 170 does not receive an input for determining to display a screen in both directions, the control unit 170 may maintain the screen as shown in FIG. 21 or the screen as shown in FIG. 23.

As described above, when the user is detected or the content is preset content, the control unit 170 may adjust at least one of the withdrawal length, the screen output direction, and the content of the display 180.

Meanwhile, according to an embodiment, the withdrawal length, screen output direction, or content of the display 180 determined according to the user detection result may be different from the withdrawal length, screen output direction, or content of the display 180 determined according to the content. Accordingly, the control unit 170 may give priority to any one of the withdrawal length, screen output direction, or content of the display 180 determined according to the user detection result, and the withdrawal length, screen output direction, or content of the display 180 determined according to the content, in advance.

A description will be given referring again to FIG. 12.

Meanwhile, when the user is not detected or the content does not correspond to preset content, the control unit 170 may output a screen according to a current display state (S15).

When the user is not detected or the content does not correspond to the preset content, the control unit 170 may output the content on the screen according to the display 180 being currently withdrawn.

Figure 25:
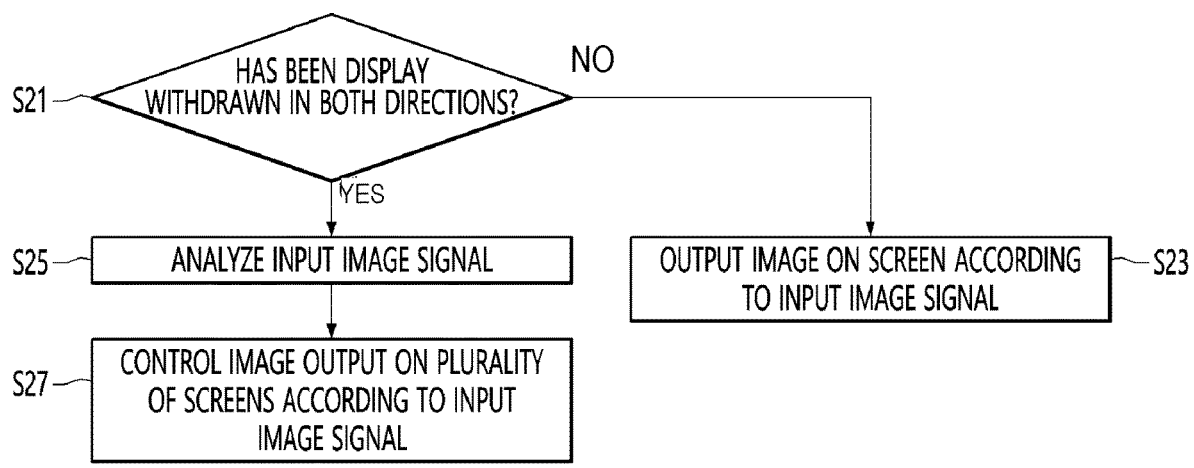
FIG. 25 is a flowchart illustrating a method of outputting a screen according to a current display state in a display device according to an embodiment of the present disclosure.

FIG. 25 is a flowchart illustrating a method of outputting a screen according to a current display state in a display device according to an embodiment of the present disclosure.

FIG. 25 may be a flowchart in which step S15 of FIG. 12 is embodied.

The control unit 170 may determine whether the display 180 is withdrawn in both directions (S21).

Here, the both directions may mean the first direction X1 and the second direction X2 described with reference to FIG. 13, but this is only exemplary and is not limited thereto.

When the display 180 is not withdrawn in both directions, the control unit 170 may output an image on a screen according to an input image signal (S23).

When the display 180 is not withdrawn in both directions, the display 180 may have been withdrawn in a single direction. Accordingly, the control unit 170 may form a screen to output an image according to the image signal input from the display 180 withdrawn in a single direction.

Meanwhile, when the display 180 has been withdrawn in both directions, the control unit 170 may analyze the input image signal (S25).

For example, the control unit 170 may analyze whether there is one input image or two or more input images. As another example, the control unit 170 may analyze whether the input image is an image input from a game console.

However, the above-described methods are merely exemplary, and the control unit 170 may analyze the input image signal in various ways.

The control unit 170 may control images output on a plurality of screens according to the input image signal (S27).

Next, a method of controlling images output on a plurality of screens according to an input image signal in the display device 100 according to an embodiment of the present disclosure will be described with reference to FIGS. 26 to 28.

Figure 26:
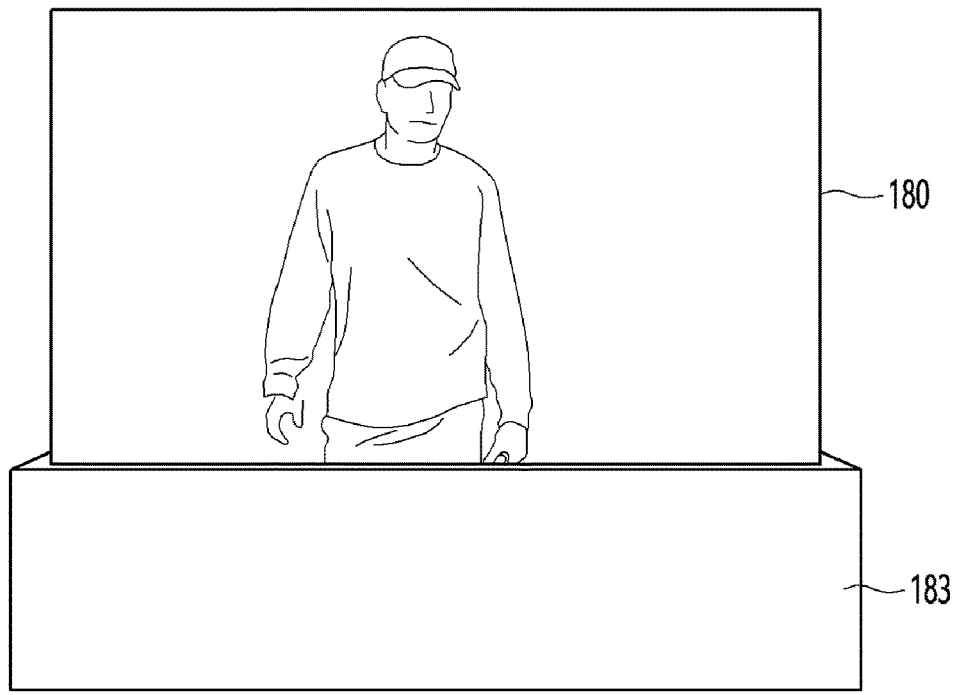
FIG. 26 is an exemplary diagram illustrating a method of controlling images output on a plurality of screens when there is only one input image in a display device, according to an embodiment of the present disclosure.
Figure 26:
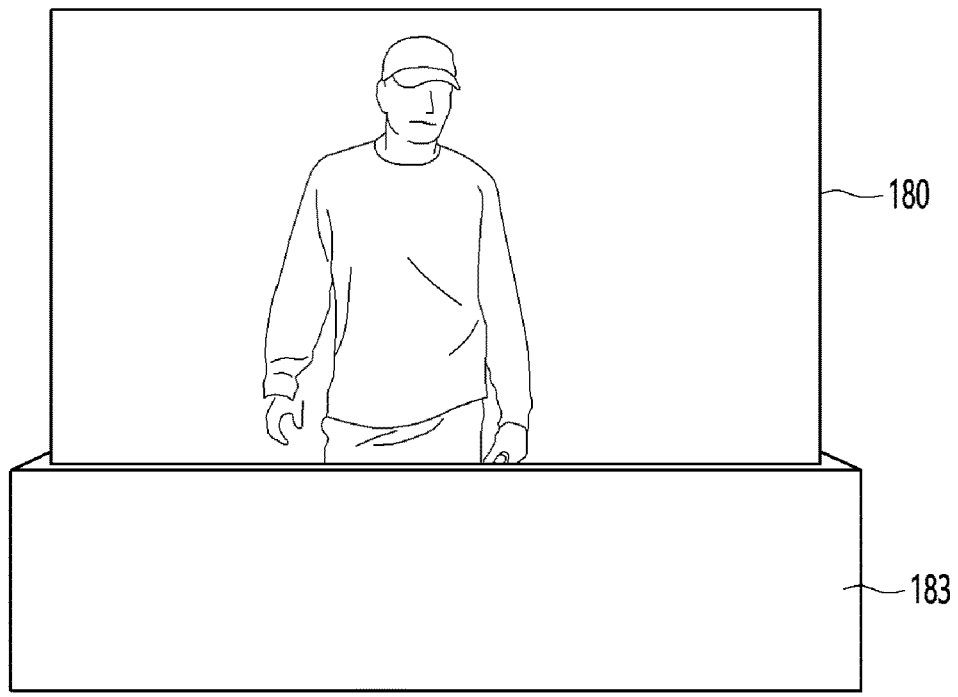

FIG. 26 is an exemplary diagram illustrating a method of controlling images output on a plurality of screens when there is only one input image in a display device, according to an embodiment of the present disclosure.

When there is only one input image, the control unit 170 may control the display 180 to duplicate the input image signal and output the input image signal and the duplicated image signal on a screen formed to face the first direction and a screen formed to face the second direction, respectively. In this case, the identical images may be displayed on the screen formed to face the first direction and the screen formed to face the second direction.

In this case, the control unit 170 may perform control such that sound is output both in the first direction and the second direction. That is, when the audio output unit 185 of the display device 100 is configured to output sound both in the first direction and the second direction, the control unit 170 may perform control such that the same sound is output in the first direction and the second direction.

Also, the control unit 170 may control the display 180 to duplicate a pointer 205 and display the pointer and the duplicated pointer on a screen formed to face the first direction and a screen formed to face the second direction, respectively. Even when displaying a UI, the control unit 170 may control the display 180 to display the same UI on the screen formed to face the first direction and the screen formed to face the second direction.

Figure 27:
FIG. 27 is an exemplary diagram illustrating a method of controlling images output on a plurality of screens when there is a plurality of input images in a display device, according to an embodiment of the present disclosure.
Figure 27:

FIG. 27 is an exemplary diagram illustrating a method of controlling images output on a plurality of screens when there is a plurality of input images in a display device, according to an embodiment of the present disclosure.

The control unit 170 may receive a plurality of image signals. For example, when there are a plurality of tuners 131, a plurality of image signals may be input. Alternatively, a plurality of image signals may be input through the broadcast reception unit 130 and the external device interface unit 135.

When there is a plurality of input images, the control unit 170 may control the display 180 to output images according to the input image signals on the screen formed to face the first direction and the screen formed to face the second direction, respectively. For example, the control unit 170 may control the display 180 such that an image according to any one of the plurality of image signals is output on the screen formed to face the first direction and an image according to the other is output on the screen formed to face the second direction.

In this case, the control unit 170 may output a plurality of sounds according to the plurality of image signals.

According to a first embodiment, the control unit 170 may output a sound corresponding to a first image signal among the plurality of image signals through the audio output unit 185, and output a sound corresponding to a second image signal among the plurality of image signals through a speaker (or headset) connected via Bluetooth.

According to a second embodiment, the control unit 170 may control the audio output unit 185 to output a sound obtained by synthesizing the sound corresponding to the first image signal and a sound for canceling the sound corresponding to the second image signal in the first direction and output a sound obtained by synthesizing the sound corresponding to the second image signal and a sound for canceling the sound corresponding to the first image signal in the second direction.

The reason for this is that the sound corresponding to the second image signal in the output direction of the sound corresponding to the first image signal may be noise, and the sound corresponding to the first image signal in the output direction of the sound corresponding to the second image signal may be noise.

In addition, according to an embodiment, the control unit 170 may control the display 180 such that the pointer 205 is displayed on only one of the screen formed to face the first direction and the screen formed to face the second direction. For example, the control unit 170 may control the display 180 to display the pointer 205 on a screen configured to output content in a forward direction among the screen formed to face the first direction and the screen formed to face the second direction.

In this case, the control unit 170 may receive a command for switching the screen on which the pointer 205 is displayed. According to an embodiment, the control unit 170 may switch the screen on which the pointer 205 is displayed in response to receiving a command for selecting a specific key provided in the remote control device 200.

When displaying a UI, the control unit 170 may control the display 180 such that the UI is displayed on a screen on which the pointer 205 is displayed. Accordingly, when switching the screen on which the pointer 205 is displayed, the control unit 170 may also switch the screen on which the UI is displayed. That is, the control unit 170 may control the display 180 such that the screen on which the pointer 205 is displayed matches the screen on which the UI is displayed.

According to another embodiment, the display device 100 may be connected to a plurality of remote control devices 200. For example, when two screens are formed on the display device 100, two remote control devices 200 are connected, and one of the two remote control devices is displayed on the screen formed to face the first direction, and the other is displayed on the screen formed to face the second direction.

When displaying the UI, the control unit 170 may display the UI on each of the screen formed to face the first direction and the screen formed to face the second direction. When a signal is received from any one of the plurality of remote control devices 200, the control unit 170 may perform signal processing only for a screen corresponding to the one remote control device 200.

Figure 28:
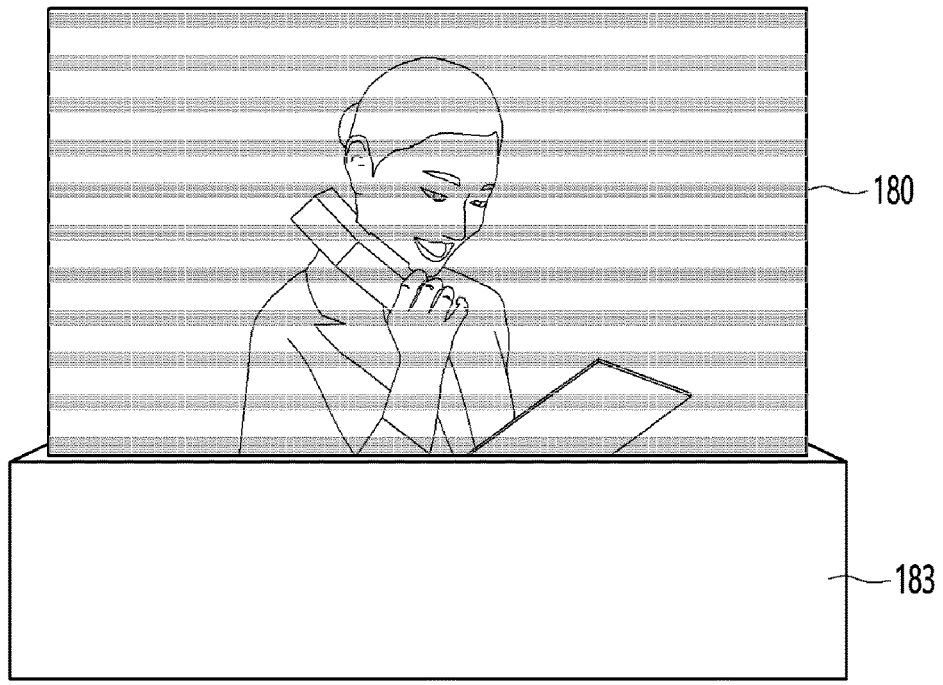
FIG. 28 is an exemplary diagram illustrating a method of controlling images output on a plurality of screens when there is an 3D (three dimensional) input image in a display device, according to an embodiment of the present disclosure.
Figure 28:
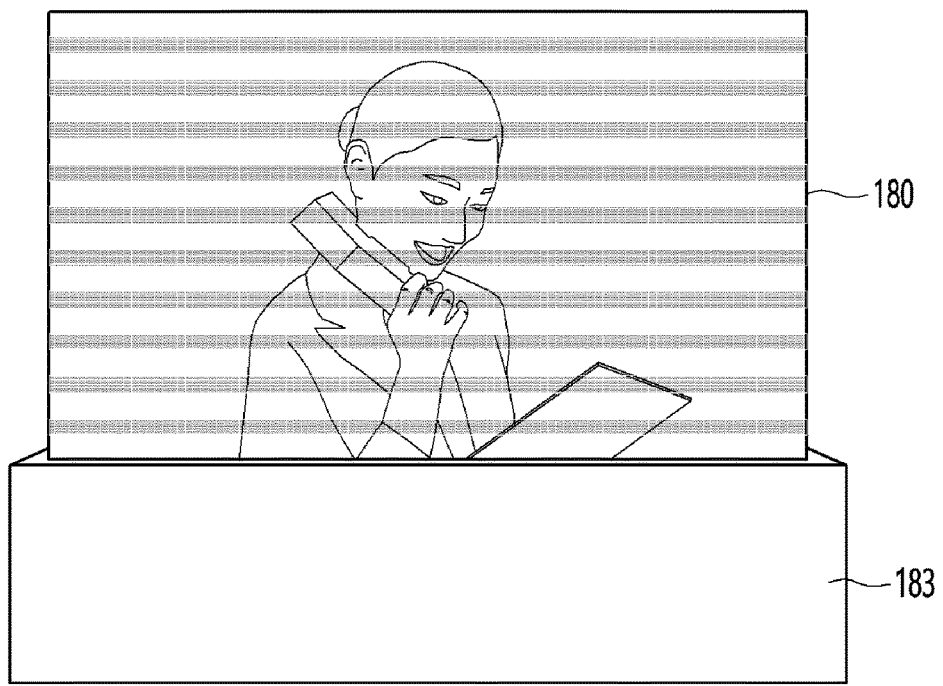

FIG. 28 is an exemplary diagram illustrating a method of controlling images output on a plurality of screens when there is an 3D (three dimensional) input image in a display device, according to an embodiment of the present disclosure.

The control unit 170 may receive a 3D image signal. The 3D image signal may be an image signal in which an image is divided into upper/lower regions or an image signal in which an image is divided into left/right regions.

The display 180 may be a transparent display. In this case, when the control unit 170 receives the 3D image signal, as shown in FIG. 28, the control unit 170 may control the display 180 to display the left image on one of the screen formed to face the first direction and the screen formed to face the second direction, and the right image on the other. Alternatively, when the control unit 170 receives the 3D image signal, the control unit 170 may control the display 180 to display the upper image on one of the screen formed to face the first direction and the screen formed to face the second direction, and the lower image on the other. Meanwhile, the control unit 170 may invert both the upper and lower images or the left or right images.

In addition, the control unit 170 may align the image of the screen formed to face the first direction and the image of the screen formed to face the second direction to form a 3D image on the display 180.

On the other hand, unlike the description presented above, when receiving a 3D image signal, the control unit 170 may control the display 180 to display the left image or the right image on one of the screen formed to face the first direction and the screen formed to face the second direction, and display another content unrelated to the 3D image signal on the other screen. Alternatively, when receiving a 3D image signal, the control unit 170 may control the display 180 to display the upper image or the lower image on one of the screen formed to face the first direction and the screen formed to face the second direction, and display another content unrelated to the 3D image signal on the other screen.

In this case, the control unit 170 may control the audio output unit 180 to output a sound corresponding to the 3D image signal.

In addition, the control unit 170 may control the display 180 such that the pointer 205 is displayed on only one of the screen formed to face the first direction and the screen formed to face the second direction. For example, the control unit 170 may control the display 180 to display the pointer 205 on a screen configured to output an image corresponding to the 3D image signal among the screen formed to face the first direction and the screen formed to face the second direction.

Meanwhile, in addition to the embodiments described with reference to FIGS. 26 to 28, when an input image is analyzed as an image input from a game console, the control unit 170 may control the display 180 to output divided images on the screens formed to face the first and second directions as described with reference to FIGS. 21 to 24.

In this case, the control unit 170 may control the display 180 such that the pointer 205 is displayed on only one of the screen formed to face the first direction and the screen formed to face the second direction. For example, the control unit 170 may control the display 180 to display the pointer 205 on a screen configured to output content in a forward direction among the screen formed to face the first direction and the screen formed to face the second direction. In addition, the control unit 170 may control the display 180 such that the UI is also displayed on the screen on which the pointer 205 is displayed.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The invention claimed is:

1. A display device comprising:
a sensor configured to detect a user;
a housing:
a roller accommodated in the housing;
a display configured to be withdrawn from or retracted into the housing by operation of the roller; and
a controller configured to control the roller such that a screen of the display is formed to face at least one of a first direction or a second direction,
wherein the controller is configured to:
control the roller such that a screen output direction matches a direction toward the detected user, when only one user is detected by the sensor, and
determine the screen output direction based on a face of the user located closest to the display among a plurality of users when the plurality of users are detected by the sensor,
determine a withdrawal length of the display based on eye level of the user, control the roller such that the screen output direction matches a direction toward a detected face of the detected closest user and adjust the withdrawal length of the display such that an eye level of the user matches an output position of content displayed on the display.

2. The display device of claim 1, wherein the controller is further configured to configure a screen facing one of the first direction or the second direction such that content is output in a forward direction, and configure a screen facing the other of the first direction or the second direction such that content is output in a reverse direction.

3. The display device of claim 1, wherein the controller is further configured to:
further detect a distance from the user via the sensor; and
control the withdrawal length of the display according to the detected distance.

4. The display device of claim 3, wherein the controller is further configured to control the roller such that the display is withdrawn out to a preset length or more when the detected distance is less than a preset distance.

5. The display device of claim 4, wherein the controller is further configured to control a number of pieces of content output on the screen according to an image ratio of first content when the display is withdrawn out to the preset length or more.

6. The display device of claim 5, wherein the controller is further configured to control the display to:
further display second content on the screen in addition to the first content based on the first content having a fixed image ratio; and
display the first content alone on the screen based on the first content not having a fixed image ratio.

7. The display device of claim 1, wherein the controller is further configured to:
further detect a distance from the user via the sensor; and
control a size of a user interface (UI) output on the screen according to the detected distance.

8. The display device of claim 7, wherein the controller is further configured to control the display such that a first size of the UI in a case in which the detected distance is less than a preset distance is smaller than a second size of the UI in a case in which the detected distance is greater than or equal to the preset distance.

9. The display device of claim 1, wherein the controller is further configured to:
further detect a distance from the user via the sensor; and
control the roller such that the withdrawal length of the display increases in proportion to the detected distance.

10. The display device of claim 1, wherein the controller is further configured to control the withdrawal length of the display according to content output on the screen.

11. The display device of claim 1, wherein the controller is further configured to control the withdrawal direction of the display according to content output on the screen.

12. The display device of claim 11, wherein the controller is further configured to control the roller such that the screen is formed to face each of the first direction and the second direction based on the content output on the screen being a game.

* * * * *